US008868934B2

(12) United States Patent
Hirezaki et al.

(10) Patent No.: US 8,868,934 B2
(45) Date of Patent: Oct. 21, 2014

(54) STORAGE SYSTEM INCLUDING ENERGY SAVING FUNCTION

(75) Inventors: Katsumi Hirezaki, Odawara (JP); Akira Murotani, Odawara (JP)

(73) Assignee: Hitachi, Ltd., Tokyo (JP)

( * ) Notice: Subject to any disclaimer, the term of this patent is extended or adjusted under 35 U.S.C. 154(b) by 1555 days.

(21) Appl. No.: 12/289,058

(22) Filed: Oct. 20, 2008

(65) Prior Publication Data

US 2010/0058080 A1    Mar. 4, 2010

(30) Foreign Application Priority Data

Aug. 27, 2008  (JP) ................................ 2008-218272

(51) Int. Cl.
G06F 1/32    (2006.01)
(52) U.S. Cl.
CPC .......... G06F 1/3268 (2013.01); Y02B 60/1246 (2013.01); G06F 1/3221 (2013.01)
USPC ....................................... 713/300
(58) Field of Classification Search
CPC .................................... G06F 3/0625
USPC ....................................... 713/300
See application file for complete search history.

(56) References Cited

U.S. PATENT DOCUMENTS

| 7,174,471 B2* | 2/2007 | Komarla et al. ............... 713/320 |
| 7,543,108 B2* | 6/2009 | Kakihara et al. .............. 711/112 |
| 7,769,947 B2* | 8/2010 | Ranganathan et al. ........ 711/114 |
| 7,814,351 B2* | 10/2010 | Lubbers et al. ............... 713/300 |
| 7,945,749 B2* | 5/2011 | Shinozaki et al. ............ 711/162 |
| 2007/0162692 A1 | 7/2007 | Nishimoto et al. |

FOREIGN PATENT DOCUMENTS

JP    2007-156597    12/2005

* cited by examiner

Primary Examiner — Kim Huynh
Assistant Examiner — Eric Chang
(74) Attorney, Agent, or Firm — Nicholas Trenkle; Stites & Harbison PLLC

(57) ABSTRACT

A controller unit, a plurality of storage devices, a log area, and a normal area are provided. A quantity of log storage devices forming the log area is smaller than a quantity of normal storage devices forming the normal area. In an operational period, in which the controller unit may accept an input-output command, a power consumption condition of the log storage devices is constantly in a normal condition in which an input or output of data can be carried out, while a power consumption condition of the normal storage devices is in an energy saving condition in which a power consumption is lower than in the normal condition. The controller unit, when receiving the input-output command if the power consumption condition of the normal storage devices is the normal condition, carries out an input or output with respect to both the normal area and the log area.

15 Claims, 17 Drawing Sheets

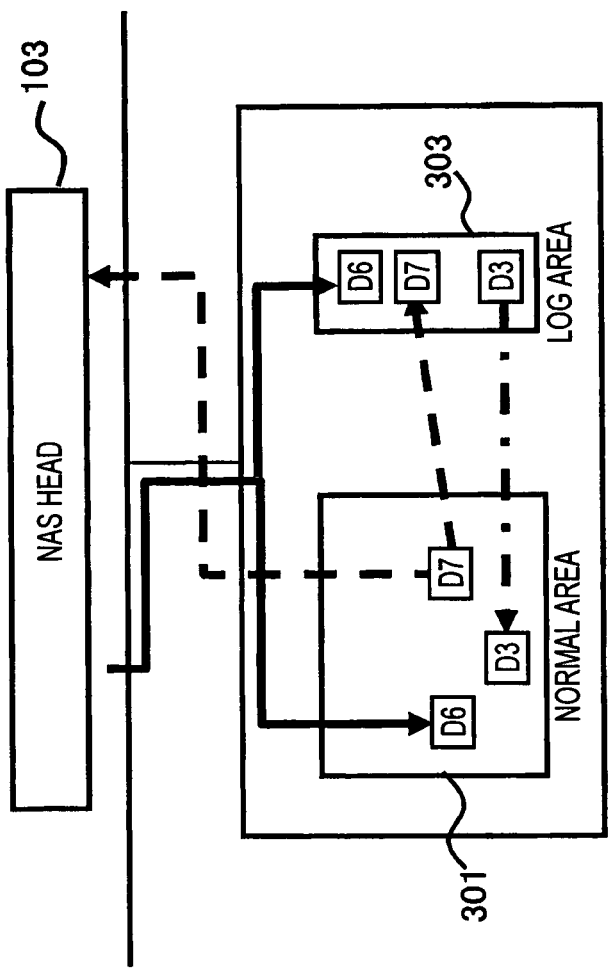

FIG. 24
FIG. 25
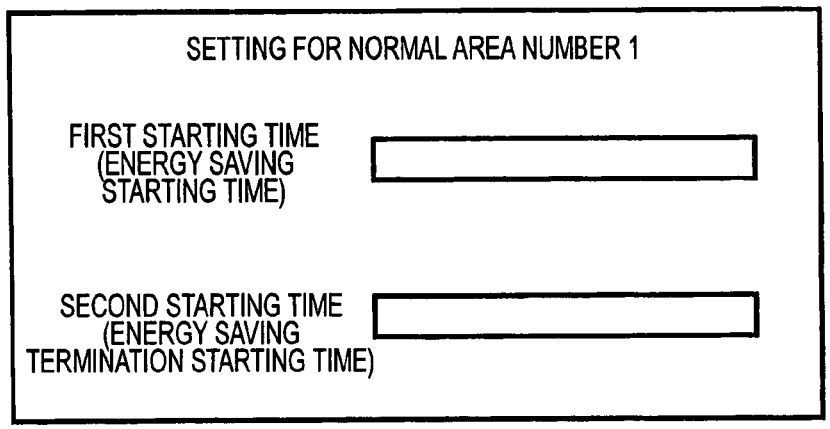
FIG. 26
| LUN | RG# | HDD# | |
|---|---|---|---|
| 1 | 1 | 1, 2, 3, 4 | ~2601 |
| . | . | . | |
| . | . | . | |

STORAGE SYSTEM INCLUDING ENERGY SAVING FUNCTION

CROSS REFERENCES TO RELATED APPLICATIONS

This application relates to and claims priority from Japanese Patent Application No. 2008-218272, filed on Aug. 27, 2008, the entire disclosure of which is incorporated herein by reference.

BACKGROUND OF THE INVENTION

1. Technical Field

The present invention relates to an energy saving of a storage system.

2. Related Art

As a technology relating to an energy saving of a storage system, for example, the technology disclosed in JP-A-2007-156597 is known. According to JP-A-2007-156597, in a plurality of disk drives, there are log drives forming a basis of a log storage area, and normal drives forming a basis of a data storage area. The log drives operate in such a way that a data write is constantly possible, while with the normal drives, normally, a data write is not possible. Write subject data from a host are written in the log storage area, after which, the normal drives being caused to operate, they are forwarded from the log storage area to the data storage area.

SUMMARY OF THE INVENTION

In the event that there are no read subject data in the log storage area, read subject data are read from the data storage area. With the normal drives forming the basis of the data storage area, normally, a data read or write is not possible. For this reason, in the event of, for example, receiving, a plurality of times, a read command having as a read subject data which are not in the log storage area, it is necessary, every time such a read command is received, that the normal drives are caused to operate in order that a read of data existing in the normal drives is possible. For this reason, time being needed until an operation start (for example, in a case of them being hard disk drives, from starting a spin-up of the disks until attaining a condition in which an input-output is possible), it can be assumed that causing a time out of an input-output from a client and, as a disk drive power consumption is high in a spin-up, reducing a frequency at which an operation start occurs, are desirable from input-output operation and energy saving aspects.

Consequently, an object of the invention is to keep to a minimum a frequency of an occurrence of a necessity of changing a power consumption condition of a storage device from an energy saving condition to a normal condition.

A controller unit and a plurality of storage devices being furnished, a log area and a normal area are provided based on the plurality of storage devices. A quantity of log storage devices forming a basis of the log area is smaller than a quantity of normal storage devices forming a basis of the normal area. In an operational period, in which the controller unit is in a condition in which it may accept an input-output command from an external apparatus, a power consumption condition of the log storage devices is constantly in a power consumption condition (a normal condition) in which an input or output of data can be carried out, while a power consumption condition of the normal storage devices, during a specified period in the operational period, is in an energy saving condition, which is a condition in which a power consumption is lower than in the normal condition.

BRIEF DESCRIPTION OF THE DRAWINGS

FIG. 7 is an illustration of write and read processes in a spin-up/resynchronization phase;
FIG. 8 is a file management data configuration diagram;
FIG. 24 is a power consumption control command configuration diagram;
FIG. 25 is one example of a phase control GUI;
FIG. 26 is a configuration table configuration diagram.

DESCRIPTION OF THE PREFERRED EMBODIMENT(S)

Figure 1:
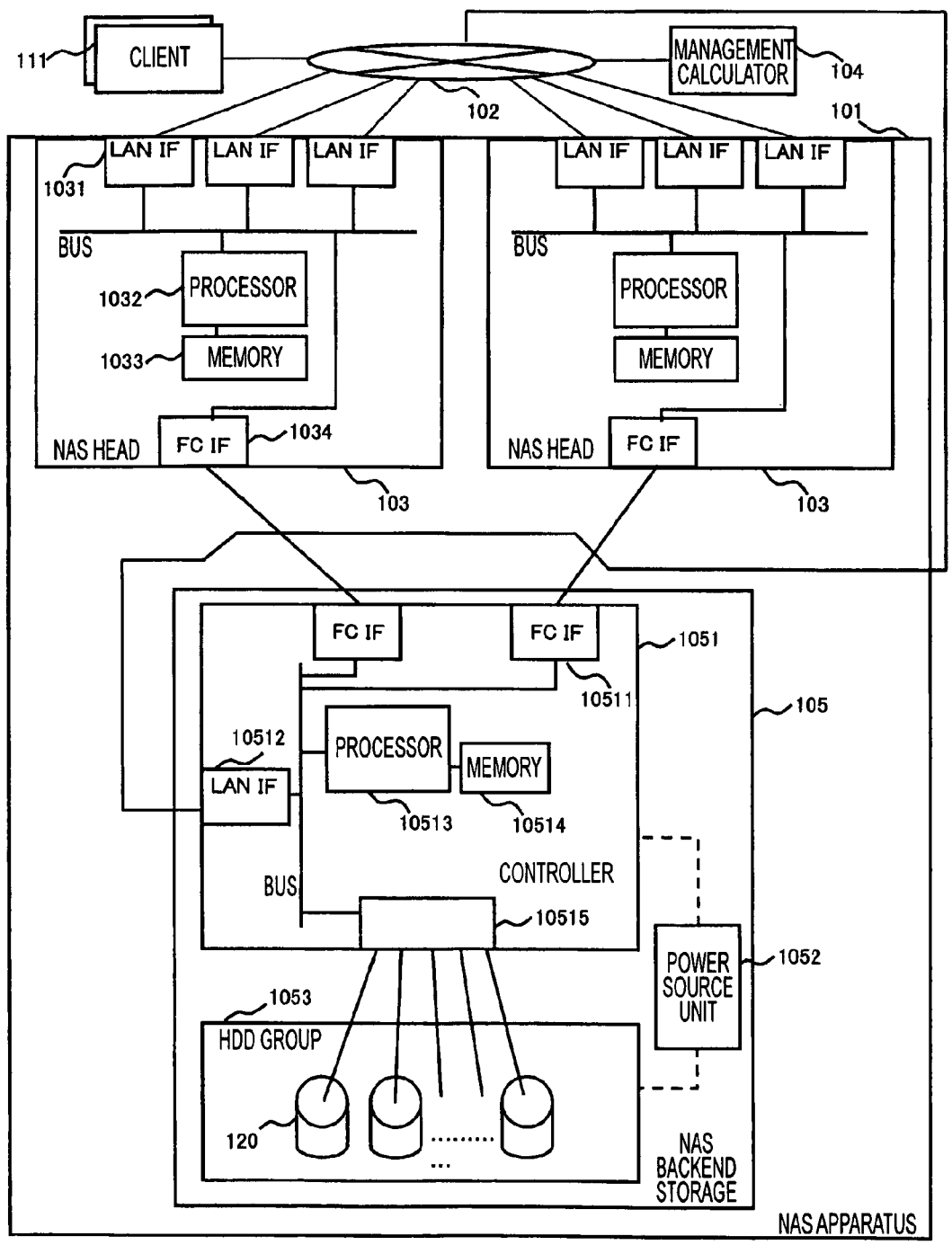
FIG. 1 shows a configuration of an entire system according to one embodiment of the invention.

Hereafter, a description will be given of one embodiment of the invention. An outline of the embodiment is as follows.

That is, in a normal condition, a storage system, on receiving a write command from an external apparatus, writes data into both a normal storage device and a log storage device. The storage system, in the event of receiving a read command, not only retrieves data from the normal storage device, but also writes the data into the log storage device. By so doing, data most recently input or output exist in the log storage device.

When entering a time period in which an input-output frequency is low, the normal storage device is put into an energy saving condition (for example, in the event that the normal storage device is a disk drive, a spin-down of the disk is carried out). In this condition, the storage system, in the event of receiving a write command from the external apparatus, writes write subject data into the log storage device, while in the event of receiving a read command from the external apparatus, the storage system retrieves read subject data from the log storage device. By so doing, the log storage device being the only memory device (a physical memory device) in the normal condition (that is, the normal storage device is in the energy saving condition), it is possible to realize a reduction in power consumption. In the event of receiving a read command in this condition, the storage system, in the event that there is no read subject data in the log storage device, changes a power consumption condition of the normal storage device from the energy saving condition to the normal condition (for example, in the event that the storage device is a disk drive, a spin-up is carried out). However, it can be supposed that there are many cases in which data which are a read subject are data which have been written within a most recent specified period from the present (for example, a period up to one week before the present). For this reason, it is possible to keep to a minimum a frequency of changing the power consumption condition from the energy saving condition to the normal condition.

Hereafter, a description will be given, referring to the drawings, of a file server apparatus, for example, an NAS (Network Attached Storage) apparatus, to which the storage system according to the embodiment of the invention is applied.

FIG. 1 shows a configuration of an entire system according to the embodiment of the invention.

One or more client calculators (hereafter, a client) 111, an NAS apparatus 101, and a management calculator 104 are connected to a communication network (for example, an LAN (Local Area Network)) 102. The NAS apparatus 101 accepts a file level input-output command from the client 111. Also, various settings are carried out on the NAS apparatus 101 from the management calculator 104.

The NAS apparatus 101 includes one or a plurality (for example, two) of NAS heads 103, and an NAS backend storage 105.

The NAS head 103 being, for example, a calculator, it includes LAN IF's 1031, a microprocessor 1032, a memory 1033, and an FC IF 1034. The LAN IF's 1031 being, for example, NIC's (Network Interface Cards), they are connected to the communication network 102. The FC IF 1034 being, for example, an HBA (Host Bus Adapter), it is connected to the NAS backend storage 105. The memory 1033 stores a computer program, and a table and the like. The processor 1032 transmits a command to the NAS backend storage 105. Also, the processor 1032, executing a program which processes a file system, based on file management data, to be described hereafter, for each file, issues a block level input-output command, based on a file level input-output command, to the NAS backend storage 105.

The NAS backend storage 105 is, for example, a disk array apparatus in which a plurality of HDD's (Hard Disk Drives) are arranged. The NAS backend storage 105 includes, for example, an HDD group 1053, a power supply unit 1052, and a controller 1051.

The power supply unit 1052 supplies power to the controller 1051 and the HDD group 1053.

The HDD group 1053 is a group of a plurality of HDD's 120. Each HDD 120 is connected to the controller 1051. The HDD group 1053 is configured of, for example, a plurality of RAID (Redundant Array of Independent (or Inexpensive) Disks) groups. Each RAID group, being configured of two or more HDD's, stores data on a predetermined RAID level.

The controller 1051 includes, for example, FC IF's 10511, a LAN IF 10512, a processor 10513, a memory 10514, and a disk IF 10515. The FC IF's 10511 are connected to the NAS head 103. The LAN IF 10512 is connected to the communication network 102. The memory 10514 includes a cache area which temporarily stores data written into the HDD 120, or read from the HDD 120. The memory 10514 stores a table, or the like. The processor 10513 processes a command from the NAS head 103.

Hereafter, a detailed description will be given of each component of the NAS apparatus 101.

Figures 22, 23:
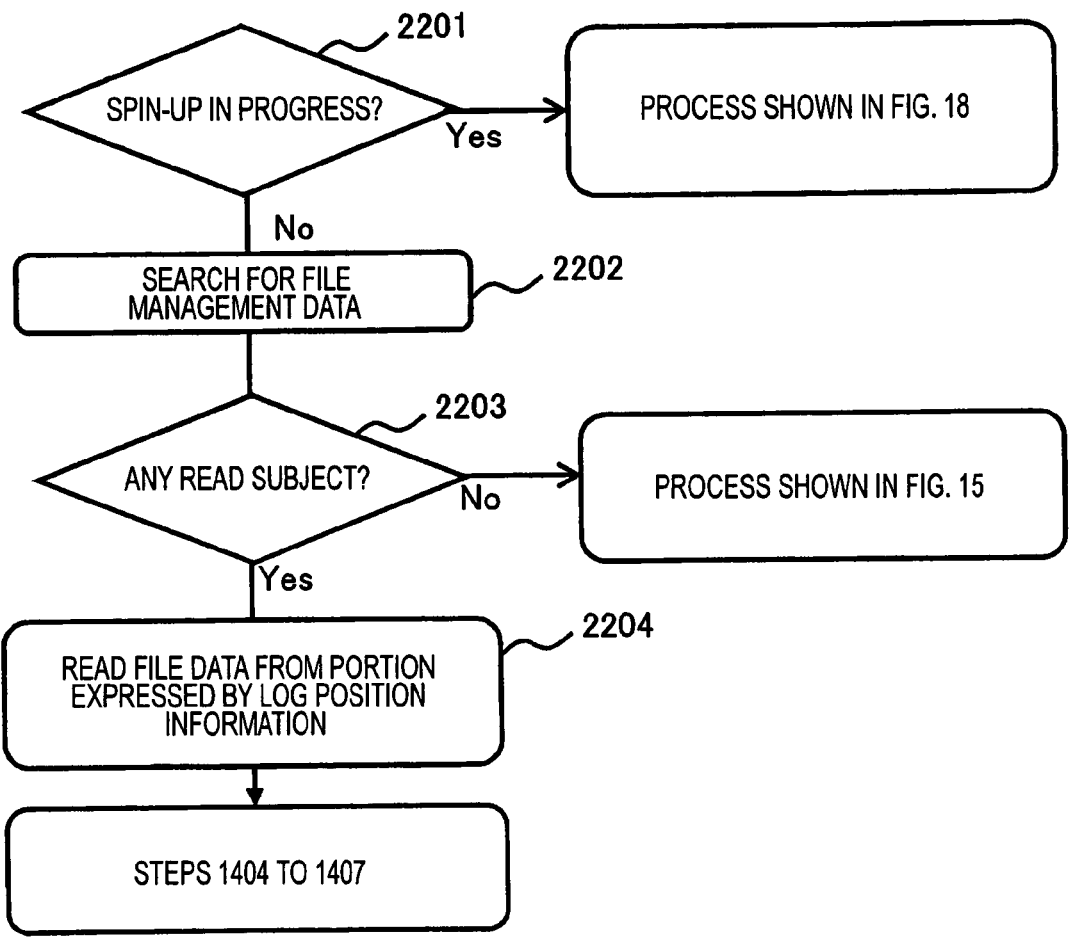
FIG. 22 shows a flow of an already existing file write process in the spin-up/resynchronization phase.
FIG. 23 is an LU management table configuration diagram.

FIG. 23 shows an LU management table stored in the memory 1033 of the NAS head 103.

A power consumption condition and an input-output frequency are stored, for each normal LUN, in the LU management table 2401.

The "normal LUN" is an LUN (Logical Unit Number) of a normal LU (Logical Unit). The "normal LU" is an LU allotted to a normal area (one or a plurality of logical volumes), to be described hereafter.

The "power consumption condition" is a power consumption condition of the normal LU. As a power consumption condition of the normal LU, there are two kinds, a normal condition and an energy saving condition. The "normal condition" is a condition in which an input-output is possible. Specifically, the normal condition is a condition in which a disk inside all HDD's (hereafter, normal HDD's) forming a basis of a normal area correlated to the normal LU is spinning rapidly (spinning at a speed at which an input-output is possible). Meanwhile, "the energy saving condition", being a condition in which a power consumption is less than in the normal condition, is a condition in which an input-output is impossible. Specifically, the energy saving condition is a condition in which the disk inside all the normal HDD's is spinning slowly (for example, a sleep condition in which the disk is not spinning).

The "input-output frequency" is a number of inputs and outputs every unit time. Specifically, for example, it is a number of file level input-output commands received every unit time specifying a file system space correlated to the normal LU.

Figure 2:
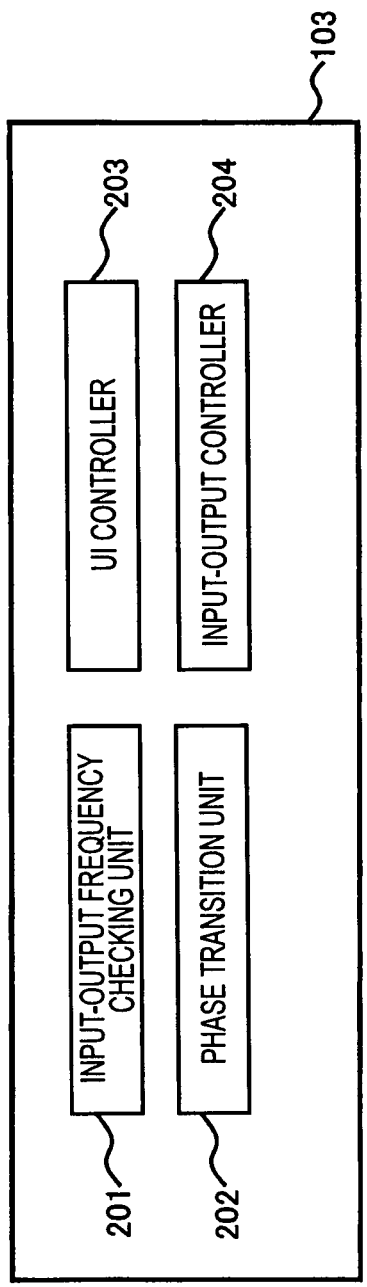
FIG. 2 is a functional block diagram of an NAS head.

FIG. 2 is a functional block diagram of the NAS head 103.

The NAS head 103 has an input-output frequency checking unit 201, a phase transition unit 202, a UI (User Interface) controller 203, and an input-output controller 204. At least one of the functions 201 to 204 is realized by, for example, the processor 1032 inside the NAS head 103 executing a computer program.

The input-output frequency checking unit 201, referring to the LU management table 2401, checks an input-output frequency for each normal LU.

The phase transition unit 202 controls a transition of a phase. As the phase, as will be described hereafter, there are three kinds, a normal phase, a spin-down phase, and a spin-up/resynchronization phase. The phase transition unit 202 issues a power consumption control command for a phase transition. The power consumption control command includes, for example, as shown in FIG. 24, a normal LUN, and information expressing a power consumption condition. A power consumption condition of a normal LU corresponding to the normal LUN is controlled so as to be the power consumption condition expressed in the information (a normal condition or an energy saving condition), and also, a power consumption condition correlated to a normal LUN of the normal LU in the LU management table 2401 is updated to the power consumption condition expressed in the information.

The UI controller 203 transmits information expressing a GUI (Graphical User Interface) to the management calculator 104. As the GUI there is, for example, a phase control GUI shown in FIG. 25. It is possible to input a first starting time, at which a transition is made from the normal phase to the spin-down phase, and a second starting time, at which a transition is made from the spin-down phase to the normal phase, in the GUI. The input first and second starting times are stored in the memory 1033 of the NAS head 103 by the UI controller 203.

The input-output controller 204 controls an input and output corresponding to the normal area, and to a log area to be described hereafter. For example, the input-output controller 204, in a case of carrying out an input or output of a certain file in accordance with a file level input-output command, transmits a block level input-output command specifying a normal LUN corresponding to a file system space in which the certain file is stored, and a block level input-output command specifying a log LUN, to the NAS backend storage 105. Also, the input-output controller 204, based on a reception of a file level input-output command specifying a file system space corresponding to a normal LU, calculates an input-output frequency corresponding to the normal LU, and updates an input-output frequency correlated to a normal LUN of the normal LU in the LU management table 2041 to the calculated input-output frequency.

FIG. 26 shows a configuration table stored in the memory 10514 included in the controller 1051 of the NAS backend storage 105.

Figure 27:
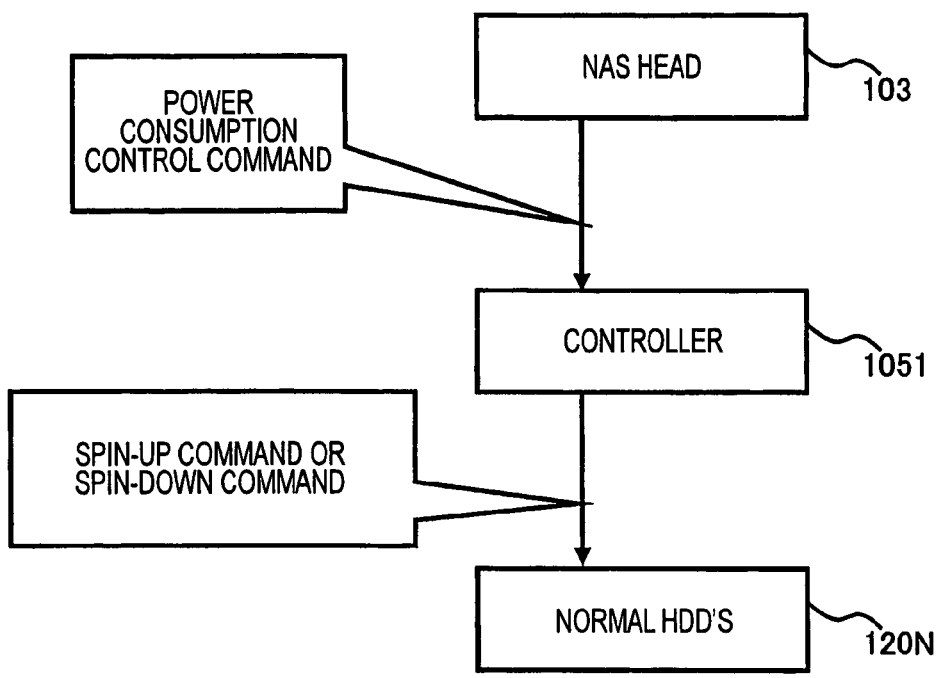
FIG. 27 shows an interaction at a time of a normal area power consumption command.

In the configuration table 2601 is recorded, for example, a correspondence relationship between a logical address and a physical address. Specifically, for example, a number of an RAID group (hereafter, an RG), and numbers of HDD's configuring the RG, are recorded for each LUN in the configuration table 2601. As shown in FIG. 27, the processor 10513 inside the controller 1051, in a case of receiving a power consumption control command (refer to FIG. 24), identifies an HDD number corresponding to an LUN in the command, and transmits a spin-up command or spin-down command, including the identified HDD number, to the HDD 120 to which the HDD number is allotted. For example, in the event that a power consumption condition in the power consumption control command expresses the normal condition, a spin-up command is issued, while in the event that the power consumption condition expresses the energy saving condition, a spin-down command is issued. It is also acceptable that an RG number is specified in the spin-up command or spin-down command, in place of the HDD number.

Figure 3:
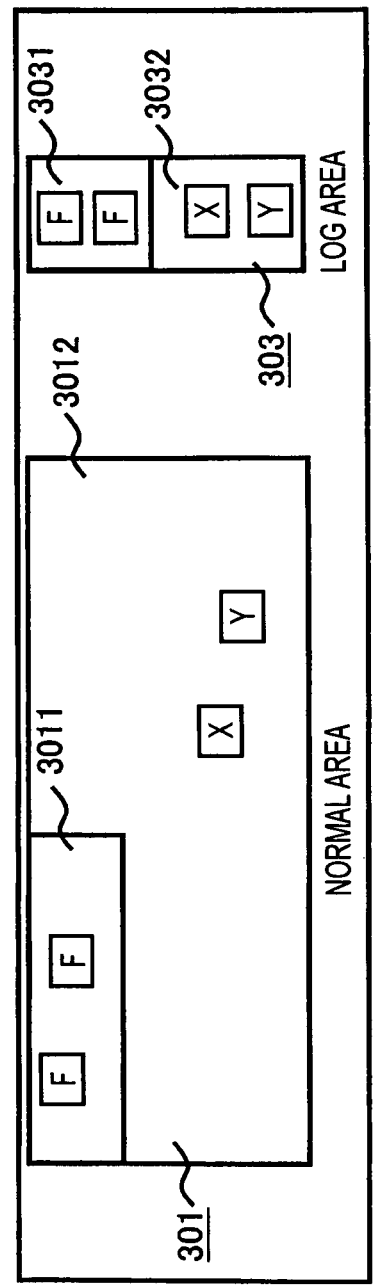
FIG. 3 shows a storage area based on an HDD group.

FIG. 3 shows a storage area based on the HDD group 1053.

As the storage area, there is a normal area 301 and a log area 303.

The normal area 301 is an area allotted to a file system space managed by the NAS head 103. All normal HDD's 120N, which configure an RG forming a basis of the normal area 301, are subjects of a spin-down. In the normal area 301, there is a sub-area (hereafter, a normal data sub-area) 3012, in which file data are stored, and a sub-area (hereafter, a normal management sub-area) 3011, in which each item of file management data corresponding to each item of file data is stored. In FIG. 3, as only one item of file data is shown in the normal area 301, only one item of file management data is shown too.

The log area 303 is an area in which are stored input-output subject file data for the normal area 301, as a log of inputs and outputs for the normal area 301. None of HDD's (hereafter, log HDD's) 120L, which configure an RG forming a basis of the log area 303, are spun-down in an operational period (a period during which an input-output command from a client 111 may be accepted). That is, a disk inside all the log HDD's 120L is constantly in a condition in which it is spinning rapidly. In the log area 303 too, in the same way as in the normal area 301, there is a sub-area (hereafter, a log data sub-area) 3032, in which file data are stored, and a sub-area (hereafter, a log management sub-area) 3031, in which each item of file management data corresponding to each item of file data is stored. In FIG. 3, as only one item of file data is shown in the log area 303, only one item of file management data is shown too.

Figure 4:
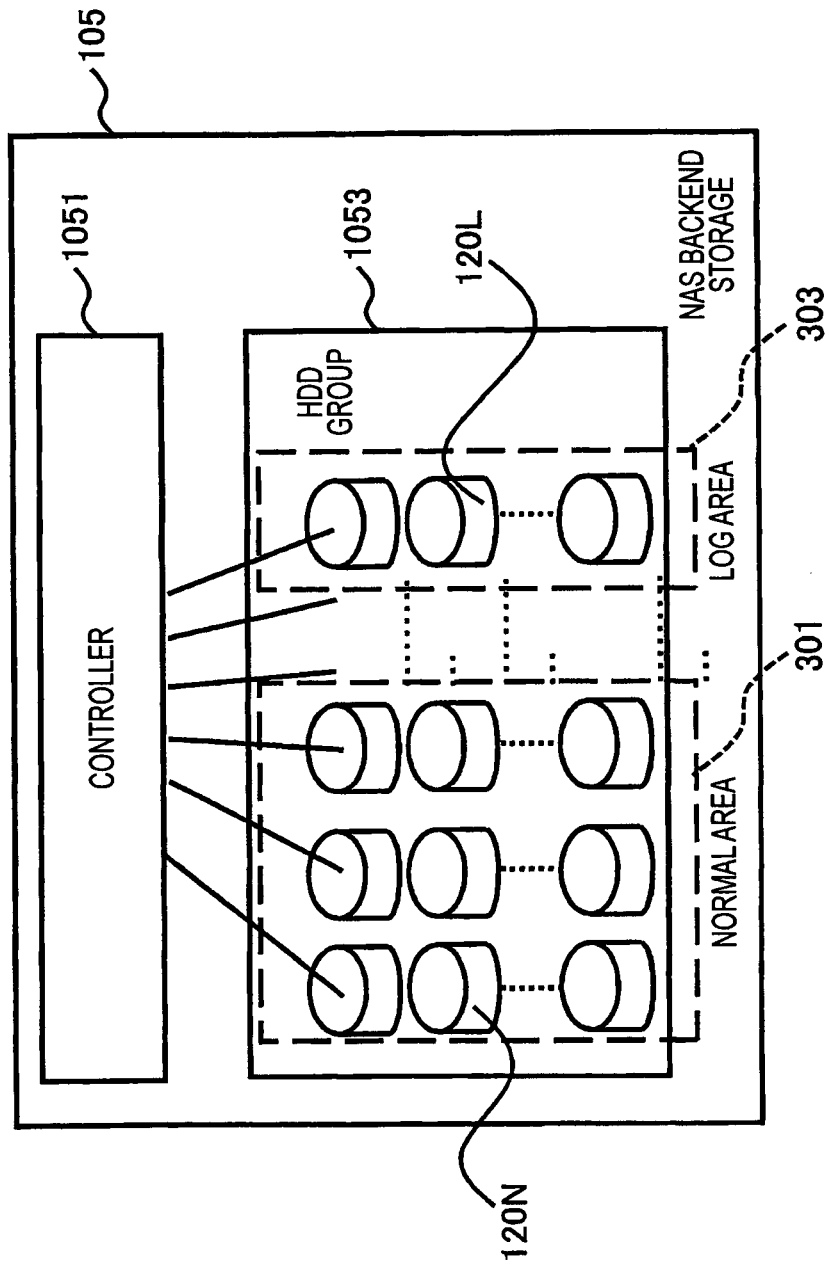
FIG. 4 is a diagram expressing a relationship between a quantity of normal HDD's forming a basis of a normal area, and a quantity of log HDD's forming a basis of a log area.
Figure 28:
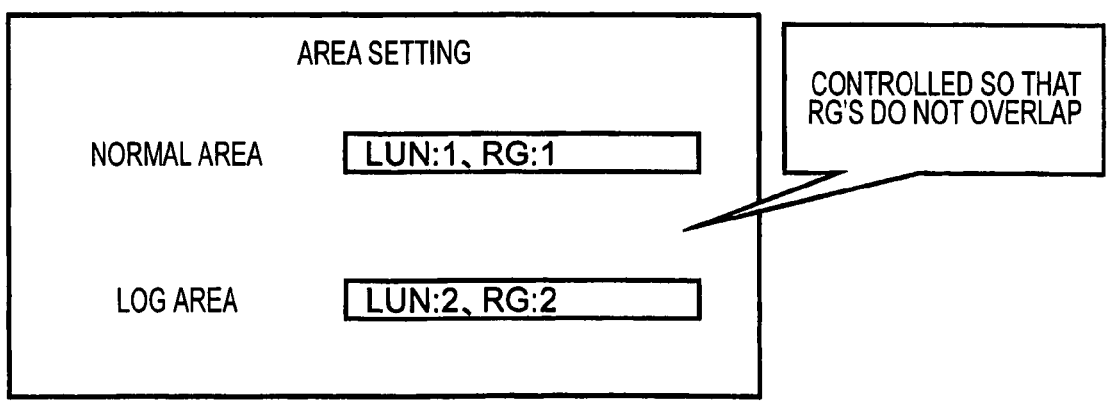
FIG. 28 is one example of an area setting GUI.

As shown in FIG. 4, a quantity of the log HDD's 120L forming the basis of one log area 303 is smaller than a quantity of the normal HDD's 120N forming the basis of one normal area 301. Also, an RG in which the log HDD's 120L exist and an RG in which the normal HDD's 120N exist are different. Although it is possible, for example, for a user to set the normal area 301 and the log area 303 via an area setting GUI (refer to FIG. 28) displayed on the management calculator 104 by the UI controller 203, at that time, the areas 301 and 303 are controlled by the UI controller 203, based on the configuration table 2601 (refer to FIG. 26) obtained from the controller 1051, in such a way that the RG forming the basis of the normal area 301 and the RG forming the basis of the log area 303 do not overlap. In the embodiment, a storage capacity of all the HDD's 120 is the same. Consequently, a storage capacity of the log area 303 is smaller than a storage capacity of the normal area 301. It is also acceptable that a storage capacity of the normal HDD and the log HDD differ (for example, it is also acceptable that a storage capacity of the log HDD is greater than a storage capacity of the normal HDD). Also, it is also acceptable that a plurality of normal areas 301 exist. In this case, it is acceptable either that one log area 303 is common to the plurality of normal areas 301, or that the log area 303 exists for each normal area 301. An RG is different for each normal area 301. In the memory 1033 of the NAS head 103 is stored, for example, information expressing which log LUN (an LUN to which the log area 303 is allotted) corresponds to which normal LUN.

So, as previously described, in the embodiment, as the phases managed by the NAS head 103, there are the following three kinds:

1. the normal phase: the phase in which the disk inside the normal HDD 120N is spinning rapidly (the phase in which the power consumption condition of the normal area 301 is the normal condition);

2. the spin-down phase: the phase in which the disk inside the normal HDD 120N is spinning down, in other words, the phase in which there is a transition in a spinning speed of the disk inside the normal HDD 120N from rapid to slow (for example, a zero speed) (the phase in which the power consumption condition of the normal area 301 is the energy saving condition);

3. the spin-up/resynchronization phase: the phase in which the disk inside the normal HDD 120N spins up (there is a transition in the spinning speed of the disk inside the normal HDD 120N from slow to rapid), and file data, among file data stored in the log area 303, not yet stored in the normal area 301 are copied from the log area 303 to the normal area 301 (the phase in which the energy saving condition of the normal area 301 is terminated).

In the event that a plurality of normal areas 301 exist, a phase in the normal area 301 is independent of that in a separate normal area 301. For example, even in the event that a certain normal area 301 is in the normal phase, it may happen that a separate normal area 301 is in the spin-down phase. In the event that, in the normal phase, the input-output frequency for the normal area 301 is low, a transition to the spin-down phase is carried out. Meanwhile, in the event that, in the spin-down phase, the input-output frequency for the normal area 301 is high, a transition to the spin-up/resynchronization phase is carried out. "The input-output frequency is low" means that, for example, the input-output frequency (for example, an average value thereof) is at or below a first threshold value for a certain period. Meanwhile, "the input-output frequency is high" means that, for example, the input-output frequency (for example, the average value thereof) is at or above a second threshold value for a certain period. It is also acceptable that the first threshold value and the second threshold value are the same value.

Hereafter, a description will be given of write and read processes in each phase.

Figure 5:
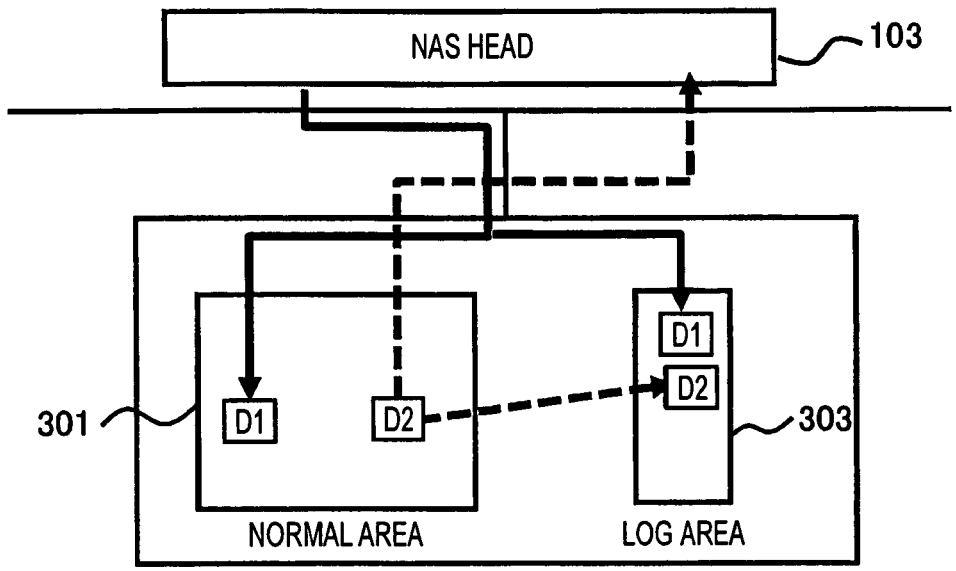
FIG. 5 is an illustration of write and read processes in a normal phase.

FIG. 5 is an illustration of the write and read processes in the normal phase.

The NAS head 103, in a case of receiving a file level write command in the normal phase, writes write subject file data D1 in both the normal area 301 and the log area 303, as shown by a solid arrow.

The NAS head 103, in a case of receiving a file level read command in the normal phase, reads read subject file data D2 from the normal area 301, and writes the file data D2 in the log area 303, as shown by a dashed line arrow.

Figure 6:
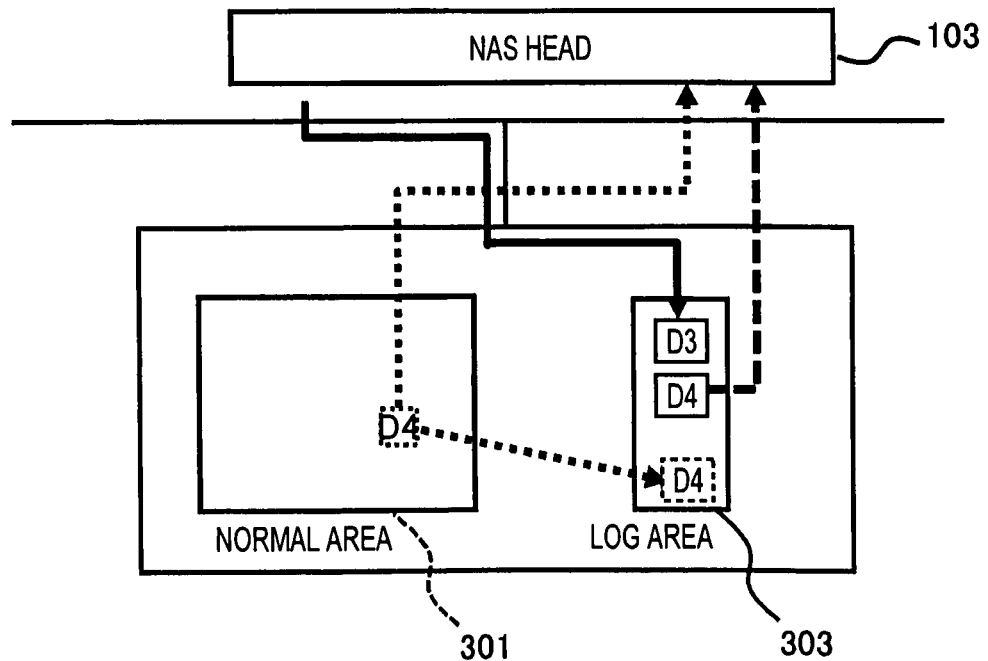
FIG. 6 is an illustration of write and read processes in a spin-down phase.

FIG. 6 is an illustration of the write and read processes in the spin-down phase.

The NAS head 103, in a case of receiving a file level write command in the spin-down phase, writes write subject file data D3 in the log area 303, as shown by a solid arrow.

The NAS head 103, in a case of receiving a file level read command in the spin-down phase, reads read subject file data D4 from the log area 303, as shown by a dashed line arrow. In the event that the file data D4 is not in the log area 303, the NAS head 103 causes all the normal HDD's 120N forming the basis of the normal area 301 to spin up, reads the file data D4 from the normal area 301, and also writes the file data D4 in the log area 303, and causes all the normal HDD's 120N forming the basis of the normal area 301 to spin down, as shown by a different kind of dashed line arrow.

FIG. 7 is an illustration of the write and read processes in the spin-up/resynchronization phase.

The NAS head 103, as shown by a chain line arrow, copies file data D3 which are stored in the log area 303, but not yet stored in the normal area 301, from the log area 303 to the normal area 301.

Aside from this, the processes are the same as in the normal phase.

That is, the NAS head 103, in a case of receiving a file level write command, writes write subject file data D6 in both the normal area 301 and the log area 303, as shown by a solid arrow.

Also, the NAS head 103, in a case of receiving a file level read command, reads read subject file data D7 from the normal area 301, and writes the file data D7 in the log area 303, as shown by a dashed line arrow.

As heretofore described, not only file data written in the normal area 301, but also file data read from the normal area 301, are stored in the log area 303. For this reason, file data input or output in a most recent period (for example, a most recent one week) are stored in the log area 303.

FIG. 8 is a file management data configuration diagram.

File management data are data generated by the NAS head 103 for each item of file data. In the file management data are included, for example, a file number, attribute information, normal position information, log position information, a normal data flag, a log data flag, and reflection destination position information.

The "file number" is a number of file data corresponding to the file management data (hereafter, "corresponding file data" in a description of FIG. 8).

The "attribute information" is information expressing an attribute relating to the corresponding file data (for example, access control information to the effect that both a write and a read are possible, or that only a read is possible, a size of the corresponding file data, and the like).

The "normal position information" is information (for example, a normal LUN and an LBA (Logical Block Address)) expressing a position of the corresponding file data in the normal area 301.

The "log position information" is information expressing a position of the corresponding file data in the log area 303.

The "normal data flag" being a flag set when the corresponding file data are written in the normal area 301 (a flag indicating that corresponding file data newer than data in the log area 303 exist), it is deleted when the corresponding file data are written in the log area 303.

The "log data flag" being a flag set when the corresponding file data are written in the log area 303 (a flag indicating that corresponding file data newer than data in the normal area 301 exist), it is deleted when the corresponding file data are written in the normal area 301.

The "reflection destination position information" is information expressing a reflection destination position in the normal area 301 of the corresponding file data stored in the log area 303. The information is, for example, information expressing a write destination position in the normal area 301 based on a file level input-output command.

Figure 9:
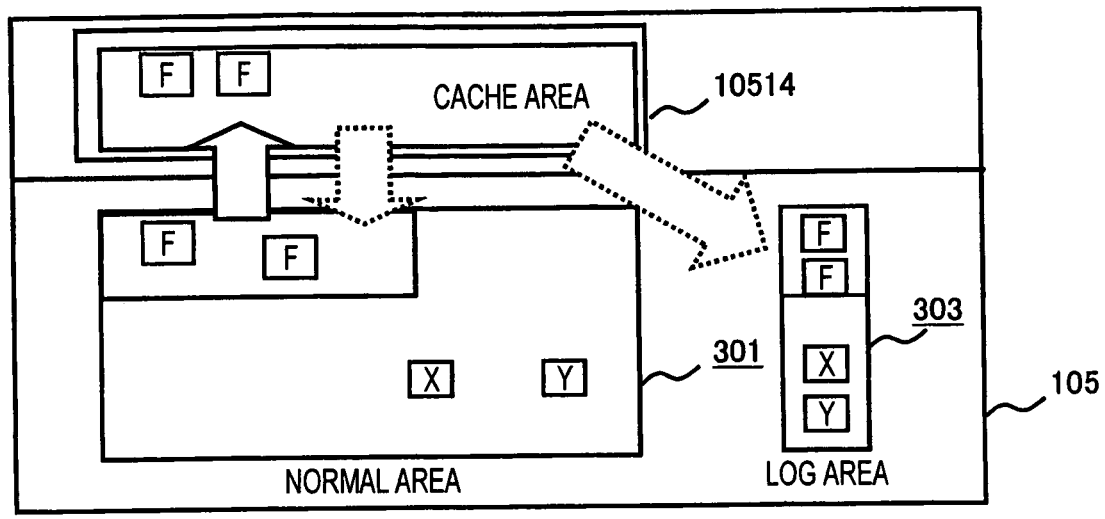
FIG. 9 is an illustration of file management data being resident in a cache area.

As shown by a solid arrow in FIG. 9, a plurality of items of file management data (or two or more items of data among the plurality of items of file management data) stored in the normal management sub-area 3011 (or the log management sub-area 3031) are read from the normal management sub-area 3011 (or the log management sub-area 3031) into the memory 10514 inside the controller 1051 (in particular, the cache area inside the memory 10514), and made resident (it is also acceptable that they are resident in the memory 1033 of the NAS head 103). The file management data in the memory 10514 after updating are written in the normal management sub-area 3011 or the log management sub-area 3031, as shown by dashed line arrows. In the case of the spin-down phase, the file management data after updating are written only in the log management sub-area 3031, while in the case of the normal phase or the spin-up/resynchronization phase, the file management data after updating are written in the normal management sub-area 3011.

Figure 10:
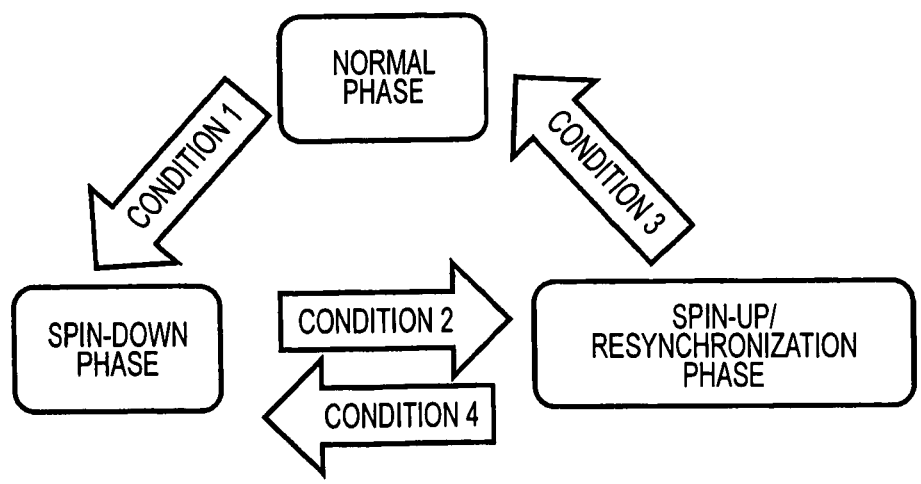
FIG. 10 shows a flow of a phase transition.

FIG. 10 shows a flow of a phase transition.

What a current phase is is managed by the phase transition unit 202 (refer to FIG. 2).

In the case of the normal phase, on an event conforming to a condition 1 occurring, a transition from the normal phase to the spin-down phase is carried out. Specifically, as an event conforming to the condition 1, there is any one of 1-1 to 1-3 described hereafter:

1-1. the present time is a first starting time (for example, a starting time of a time period in which the input-output frequency is low) designated by the user from the phase control GUI (refer to FIG. 25), 1-2. the input-output frequency corresponding to the normal area 301 (the input-output frequency recorded in the LU management table (refer to FIG. 23)) is equal to or lower than a first threshold value (for example, 5% of an average value of the input-output frequency) for a certain time, or 1-3. the user manually instructs the normal area 301 to be put into the energy saving condition via a GUI displayed by the UI controller 203.

The phase transition unit 202 issues a power consumption control command, including a normal LUN and a power consumption condition expressing "energy saving condition", to the controller 1051, and the controller 1051 issues a spin-down command to all the normal HDD's existing in an RG corresponding to the normal LUN. By so doing, the transition from the normal phase to the spin-down phase is carried out.

In the case of the spin-down phase, on an event conforming to a condition 2 occurring, a transition from the spin-down phase to the spin-up/resynchronization phase is carried out. Specifically, as an event conforming to the condition 2, there is any one of 2-1 to 2-4 described hereafter:

2-1. the present time is a second starting time (for example, a starting time of a time period in which the input-output frequency is high) designated by the user from the phase control GUI (refer to FIG. 25), 2-2. the input-output frequency corresponding to the normal area 301 (the input-output frequency recorded in the LU management table (refer to FIG. 23)) is equal to or higher than a second threshold value (for example, 5% of the average value of the input-output frequency) for a certain time, 2-3. the user manually instructs the normal area 301 to be put into the normal condition via the GUI displayed by the UI controller 203, or 2-4. there is no read subject file data in the log area 303.

The phase transition unit 202 issues a power consumption control command, including the normal LUN and a power consumption condition expressing "normal condition", to the controller 1051, and the controller 1051 issues a spin-up command to all the normal HDD's existing in the RG corresponding to the normal LUN. By so doing, the transition from the spin-down phase to the spin-up/resynchronization phase is carried out.

In the case of the spin-up/resynchronization phase, on an event conforming to a condition 3 occurring, a transition from the spin-up/resynchronization phase to the normal phase is carried out. As an event conforming to the condition 3, there is 3-1 described hereafter:

3-1. after the transition to the spin-up/resynchronization phase is carried out due to the occurrence of any one of the heretofore described 2-1 to 2-3, all the file data stored in the log area 303 attain a condition in which they are stored in the normal area 301 (all the file data which are stored in the log area 303, but not yet stored in the normal area 301, are copied to the normal area 301).

By so doing, the transition from the spin-up/resynchronization phase to the normal phase is carried out.

Meanwhile, in the case of the spin-up/resynchronization phase, on an event conforming to a condition 4 occurring, a transition from the spin-up/resynchronization phase to the spin-down phase is carried out. Specifically, as an event conforming to the condition 4, there is 4-1 described hereafter:

4-1. after the transition to the spin-up/resynchronization phase is carried out due to the occurrence of the heretofore described 2-4 event, and after the relevant data (the read subject file data which are not in the log area 303) are read from the normal area 301, and also written in the log area 303.

The phase transition unit 202 issues a power consumption control command, including the normal LUN and a power consumption condition expressing "energy saving condition", to the controller 1051, and the controller 1051 issues a spin-down command to all the normal HDD's existing in the RG corresponding to the normal LUN. By so doing, the transition from the spin-up/resynchronization phase to the spin-down phase is carried out.

Hereafter, a description will be given of a flow of processes carried out in the embodiment.

Figure 29:
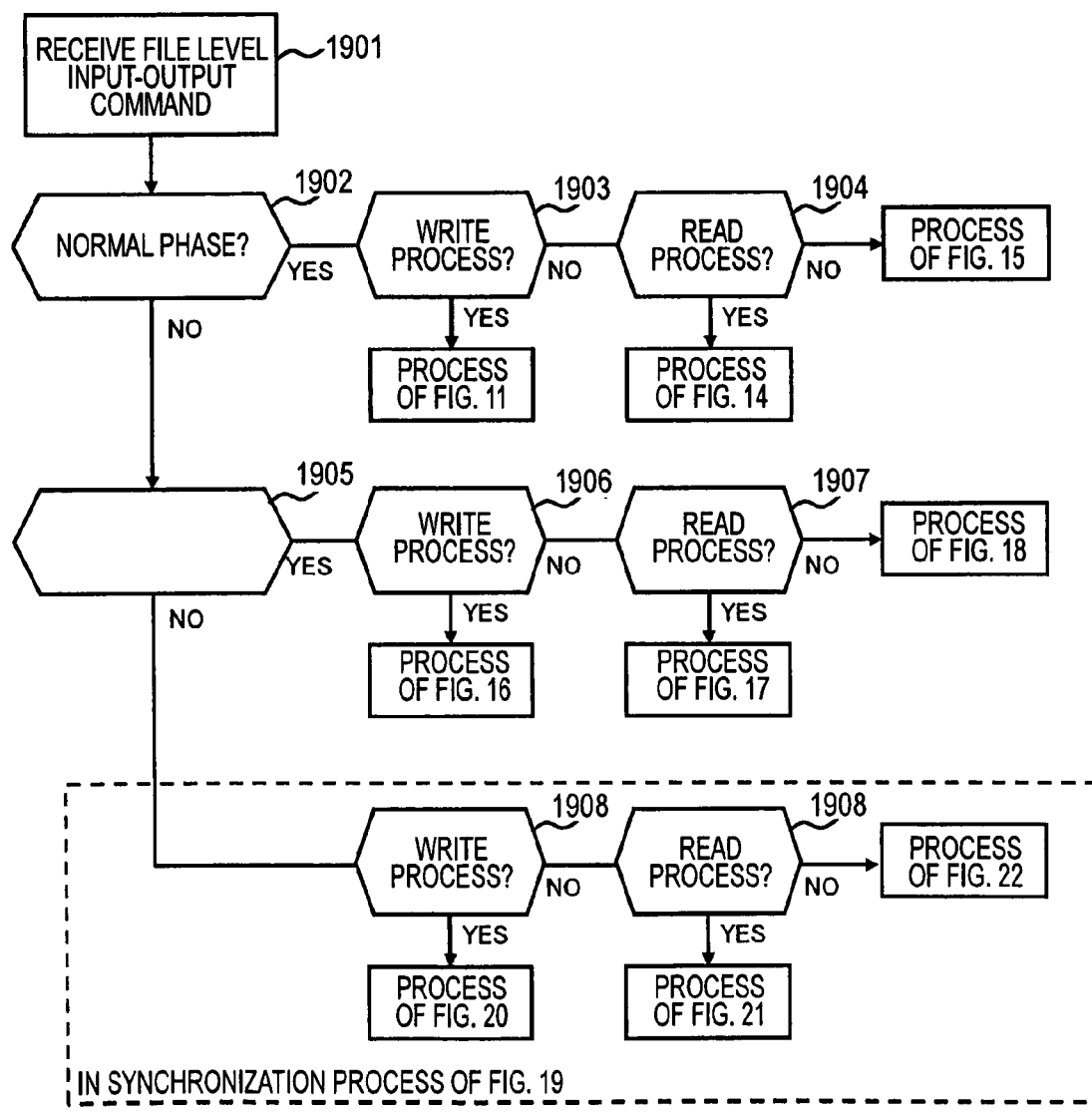
FIG. 29 shows an overall outline of a flow of a file level input-output command process.

FIG. 29 shows an overall outline of a flow of a file level input-output command process.

When receiving a file level input-output command (step 1901), the input-output controller 204 (refer to FIG. 2), in the event that the current phase is the normal phase (step 1902: Yes), executes processes 29-1 to 29-3, described hereafter:

29-1. if the command is a new file data write command (step 1903: Yes), the input-output controller 204 carries out the process shown in FIG. 11, 29-2. if the command is a read command (step 1903: No, step 1904: Yes), the input-output controller 204 carries out the process shown in FIG. 14, and 29-3. if the command is an already existing file data write command (step 1904: No), the input-output controller 204 carries out the process shown in FIG. 15.

When receiving a file level input-output command (step 1901), the input-output controller 204, in the event that the current phase is the spin-down phase (step 1902: No, step 1905: Yes), executes processes 29-4 to 29-6, described hereafter:

29-4. if the command is a new file data write command (step 1906: Yes), the input-output controller 204 carries out the process shown in FIG. 16, 29-5. if the command is a read command (step 1906: No, step 1907: Yes), the input-output controller 204 carries out the process shown in FIG. 17, and 29-6. if the command is an already existing file data write command (step 1907: No), the input-output controller 204 carries out the process shown in FIG. 18.

When receiving a file level input-output command (step 1901), the input-output controller 204, in the event that the current phase is the spin-up/resynchronization phase (step 1902: No, step 1905: No), executes processes 29-7 to 29-9, described hereafter:

29-7. if the command is a new file data write command (step 1908: Yes), the input-output controller 204 carries out the process shown in FIG. 20, 29-8. if the command is a read command (step 1908: No, step 1909: Yes), the input-output controller 204 carries out the process shown in FIG. 21, and 29-9. if the command is an already existing file data write command (step 1909: No), the input-output controller 204 carries out the process shown in FIG. 22.

Figure 11:
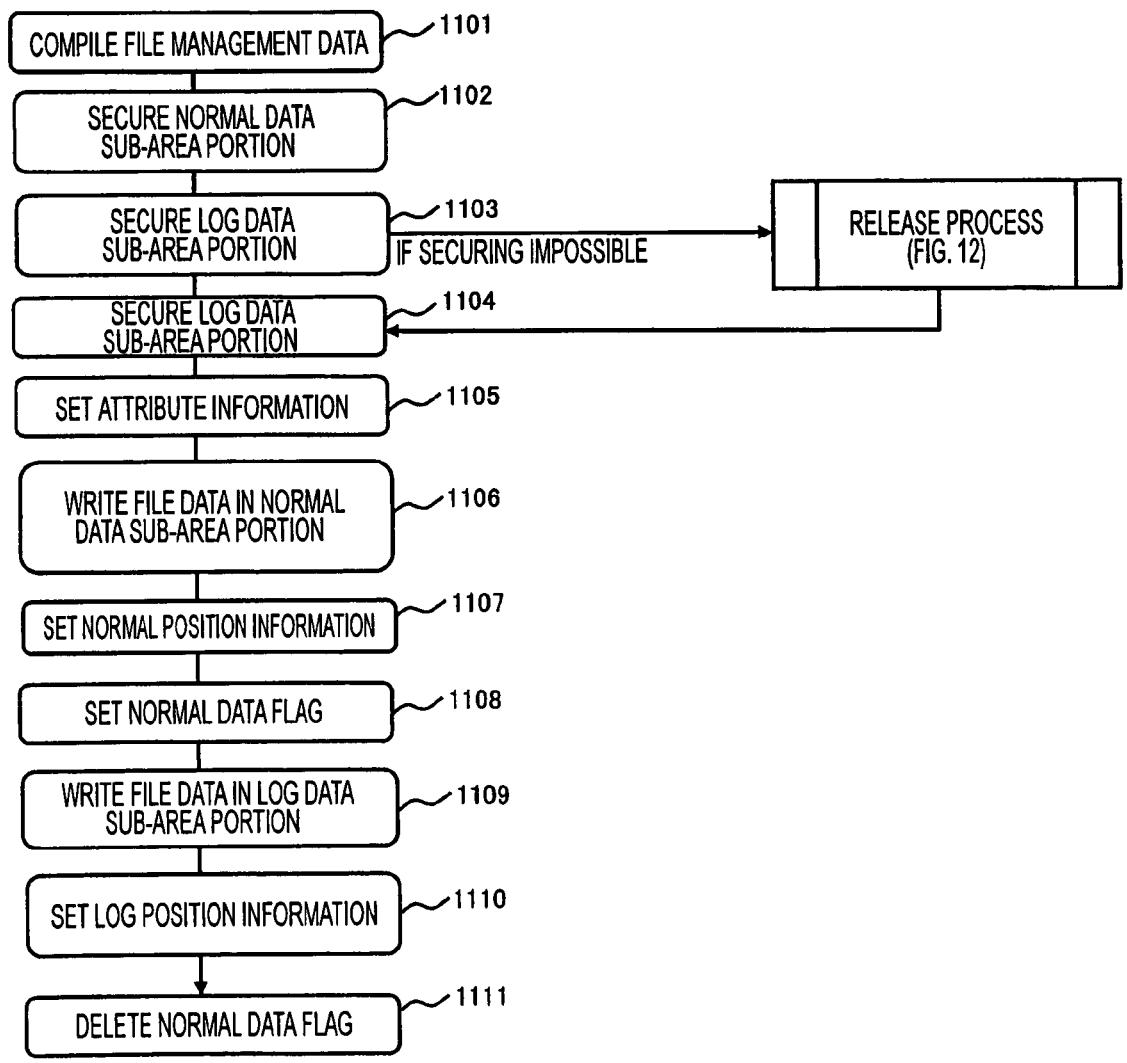
FIG. 11 shows a flow of a new file write process in the normal phase.

FIG. 11 shows a flow of a new file write process in the normal phase.

The input-output controller 204 compiles file management data corresponding to the new file data (step S1101) Hereafter, the file management data compiled in this step 1101 will be referred to as "subject management data" in the description of FIG. 11.

Next, the input-output controller 204 secures a normal data sub-area portion (step 1102). A "normal data sub-area portion" is one area inside the normal data sub-area 3012.

Figure 12:
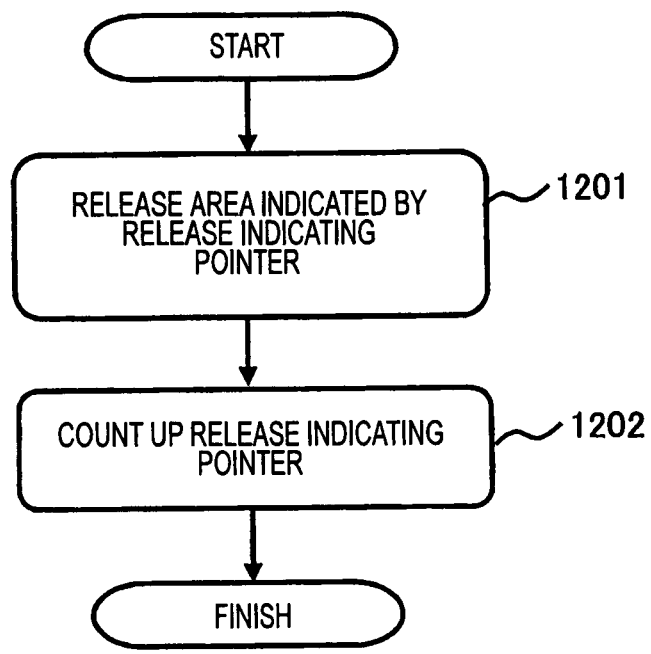
FIG. 12 shows a flow of a release process.
Figure 13:
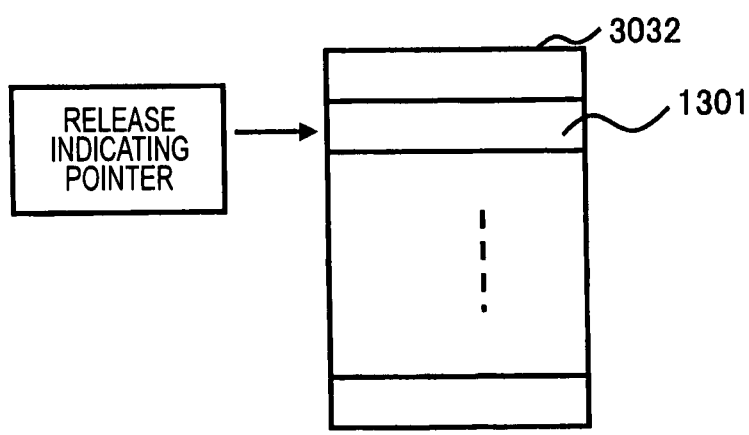
FIG. 13 shows a log area management method.

Next, the input-output controller 204 secures a log data sub-area portion (step 1103). A "log data sub-area portion" is one area inside the log data sub-area 3032. If it is not possible to secure a log data sub-area portion, the input-output controller 204 executes the release process shown in FIG. 12. That is, the input-output controller 204 releases an area (a log data sub-area portion) indicated by a release indicating pointer (step 1201), and counts up the release indicating pointer (step 1202). The release indicating pointer, as shown in FIG. 13, points to a log data sub-area portion 1301 in the log data sub-area 3032, in which file data written the longest ago are stored. Consequently, releasing the area portion 1301 indicated by the release indicating pointer means releasing the area in which the file data written the longest ago are stored.

Next, the input-output controller 204 sets a file number of the new file data in the subject management data (step 1104).

Next, the input-output controller 204 sets attribute information relating to the new file data in the subject management data (step 1105).

Next, the input-output controller 204 writes the new file data in the portion secured in step 1102 (step 1106).

Next, the input-output controller 204 sets normal position information in the subject management data (step 1107). The normal position information is information expressing a write destination position of the new file data in the normal data sub-area 3012, or in other words, information expressing a position of the portion secured in step 1102.

Next, the input-output controller 204 sets a normal data flag in the subject management data (step 1108).

Next, the input-output controller 204 writes the new file data in the portion secured in step 1103 (step 1109).

Next, the input-output controller 204 sets log position information in the subject management data (step 1110). The log position information is information expressing a write destination position of the new file data in the log data sub-area 3032, or in other words, information expressing a position of the portion secured in step 1103.

Lastly, the input-output controller 204 deletes the normal data flag from the subject management data (step 1111).

Figure 14:
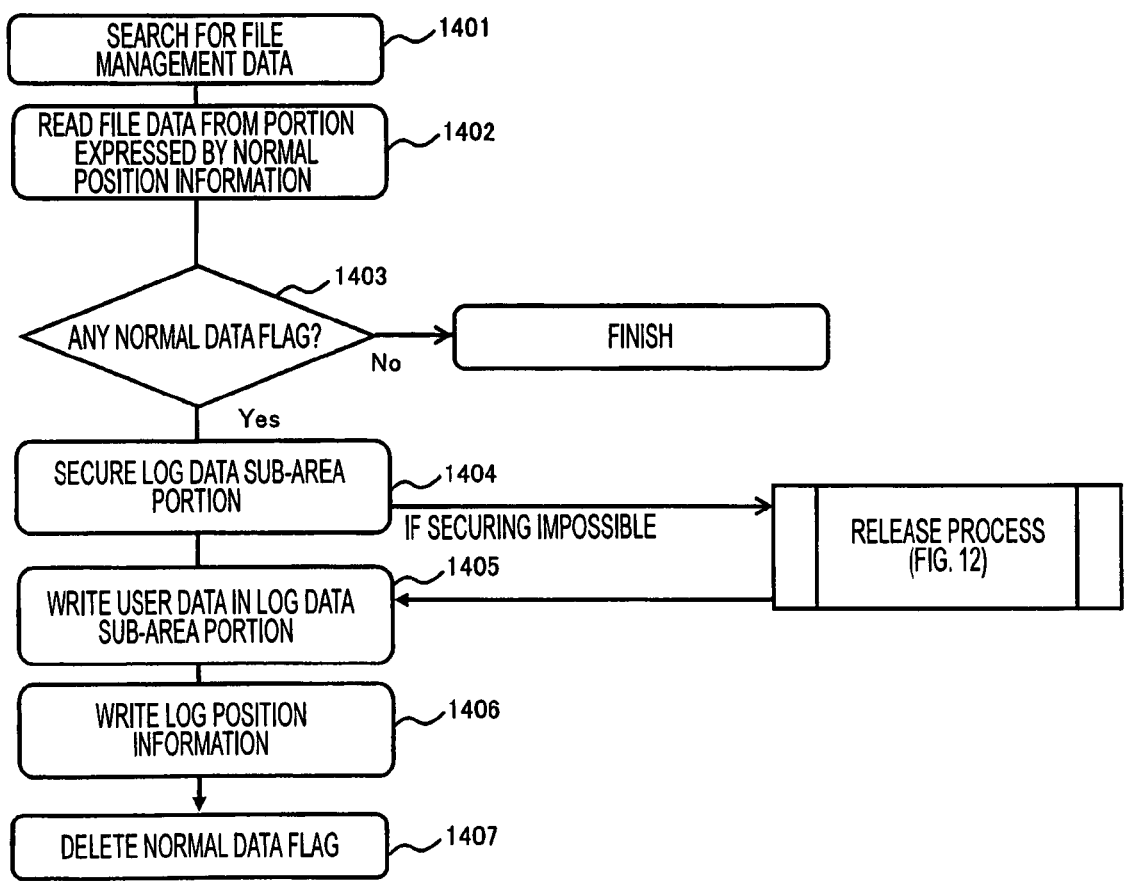
FIG. 14 shows a flow of a read process in the normal phase.

FIG. 14 shows a flow of a read process in the normal phase.

The input-output controller 204 searches for file management data corresponding to read subject file data (step 1401). Hereafter, file management data found by the search of this step 1401 will be referred to as "subject management data" in the description of FIG. 14.

Next, the input-output controller 204 reads the read subject file data from a portion inside the subject management data expressed by normal position information (step 1402). The file data read are presented to the client 111.

Next, if there is a normal data flag in the subject management data (step 1403: Yes), that is, if the read subject file data are not stored in the log data sub-area 3032, the input-output controller 204 secures a log data sub-area portion (step 1404), and writes the read subject file data in the secured portion (step 1405). Then, the input-output controller 204 sets log position information, expressing a position of the portion secured in step 1404, in the subject management data (step 1406), and deletes the normal data flag from the subject management data (step 1407).

Figure 15:
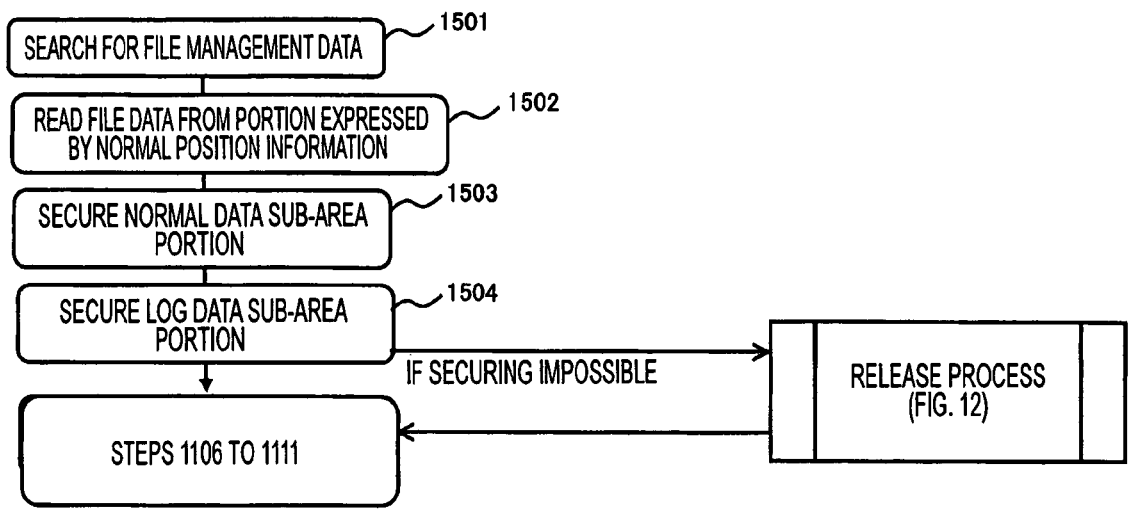
FIG. 15 shows a flow of an already existing file write process in the normal phase.

FIG. 15 shows a flow of an already existing file write process in the normal phase.

The input-output controller 204 searches for file management data corresponding to subject file data (step 1501) Hereafter, file management data found by the search of this step 1501 will be referred to as "subject management data" in the description of FIG. 15.

Next, the input-output controller 204 reads the subject file data from a portion inside the subject management data expressed by normal position information (step 1502). The file data read are presented to the client 111.

Next, the input-output controller 204 secures a normal data sub-area portion (step 1503).

Next, the input-output controller 204 secures a log data sub-area portion (step 1504).

Subsequently, the input-output controller 204 executes the steps 1106 to 1111 shown in FIG. 11.

Figure 16:
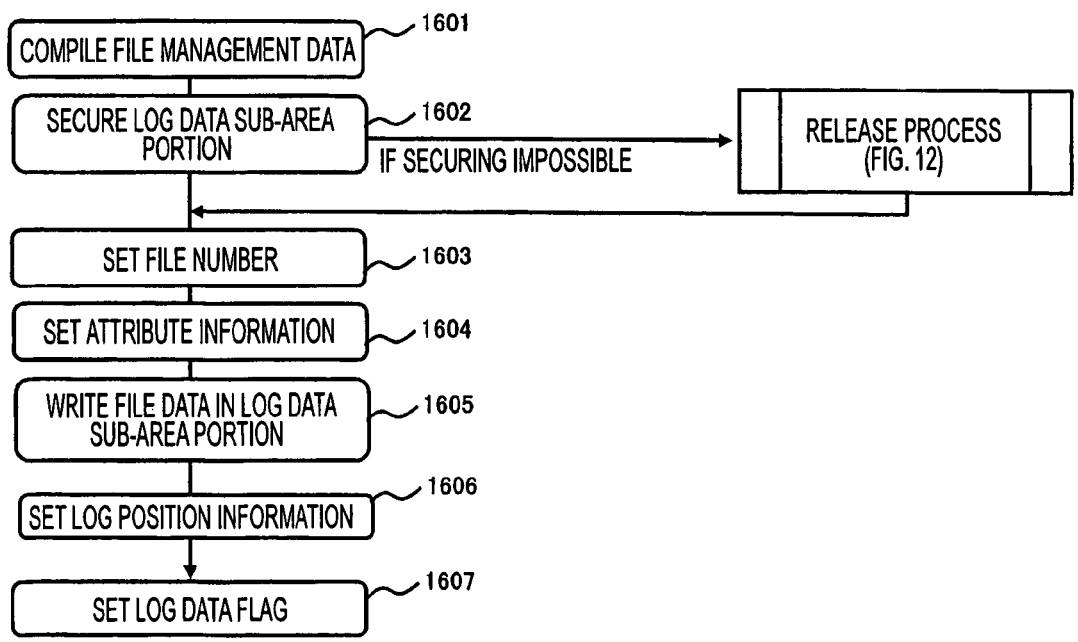
FIG. 16 shows a flow of a write process in the spin-down phase.

FIG. 16 shows a flow of a new file write process in the spin-down phase.

The input-output controller 204 compiles file management data corresponding to the new file data (step S1601) Hereafter, the file management data compiled in this step 1601 will be referred to as "subject management data" in the description of FIG. 16.

Next, the input-output controller 204 secures a log data sub-area portion (step 1602).

Next, the input-output controller 204 sets a file number of the new file data in the subject management data (step 1603).

Next, the input-output controller 204 sets attribute information relating to the new file data in the subject management data (step 1604).

Next, the input-output controller 204 writes the new file data in the portion secured in step 1602 (step 1605).

Next, the input-output controller 204 sets log position information, expressing a position of the portion secured in step 1602, in the subject management data (step 1606).

Lastly, the input-output controller 204 sets a log data flag in the subject management data (step 1607).

Figure 17:
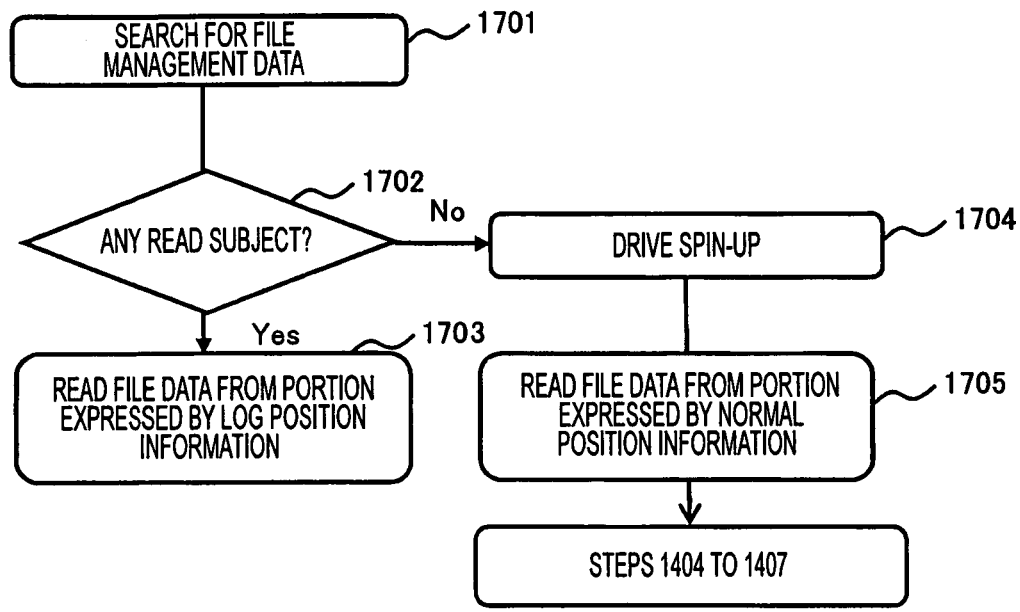
FIG. 17 shows a flow of a read process in the spin-down phase.

FIG. 17 shows a flow of a read process in the spin-down phase.

The input-output controller 204 searches for file management data corresponding to read subject file data (step 1701). Hereafter, file management data found by the search of this step 1701 will be referred to as "subject management data" in the description of FIG. 17.

Next, the input-output controller 204 determines whether or not the read subject file data are in the log area 303 (step 1702). Specifically, for example, the input-output controller 204 determines whether or not a normal data flag has been set in the subject management data.

If a result of the determination of step 1702 is positive (that is, if no normal data flag has been set in the subject management data) (step 1702: Yes), the input-output controller 204 reads the read subject file data from a portion in the subject management data expressed by log position information. The file data read are presented to the client 111.

Meanwhile, if the result of the determination of step 1702 is negative (that is, if a normal data flag has been set in the subject management data) (step 1702: No), the input-output controller 204 calls up the phase transition unit 202, and the phase transition unit 202 executes a drive spin-up (step 1704). In this step, the phase transition unit 202 issues a power consumption control command for changing the power consumption condition of the normal area 301 from the energy saving condition to the normal condition, and the controller 1051, in compliance with the command, issues a spin-up command to all the normal HDD's 120N forming the basis of the normal area 301.

The input-output controller 204, in the event that the spin-up of all the normal HDD's 120N is completed, reads the read subject file data from a portion inside the subject management data expressed by normal position information (step 1705). Subsequently, the input-output controller 204 executes the steps 1404 to 1407 shown in FIG. 14.

Figure 18:
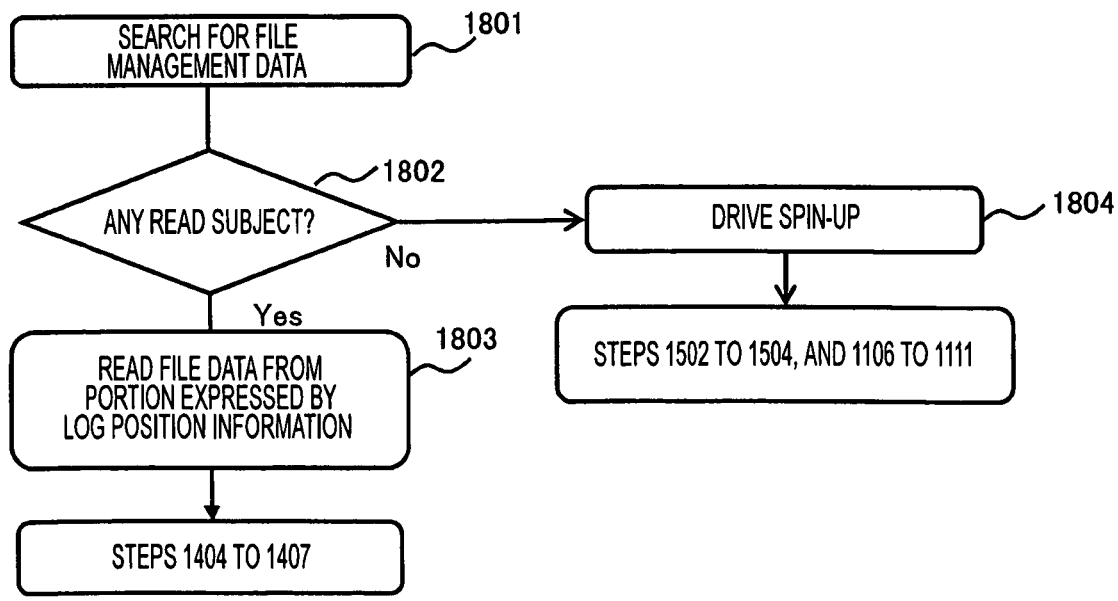
FIG. 18 shows a flow of an already existing file write process in the spin-down phase.

FIG. 18 shows a flow of an already existing file write process in the spin-down phase.

The input-output controller 204 searches for file management data corresponding to subject file data (step 1801) Hereafter, file management data found by the search of this step 1801 will be referred to as "subject management data" in the description of FIG. 18.

Next, the input-output controller 204 determines whether or not the subject file data are in the log area 303 (step 1802).

If a result of the determination of step 1802 is positive (step 1802: Yes), the input-output controller 204 reads the subject file data from a portion inside the subject management data expressed by log position information. The file data read are presented to the client 111. Subsequently, the input-output controller 204 executes the steps 1404 to 1407 shown in FIG. 14.

Meanwhile, if the result of the determination of step 1802 is negative (step 1802: No), the input-output controller 204 calls up the phase transition unit 202, and the phase transition unit 202 executes a drive spin-up (step 1804). The input-output controller 204, in the event that the spin-up of all the normal HDD's 120N is completed, executes the steps 1502 to 1504 shown in FIG. 15, after which, it executes the steps 1106 to 1111 shown in FIG. 11.

Figure 19:
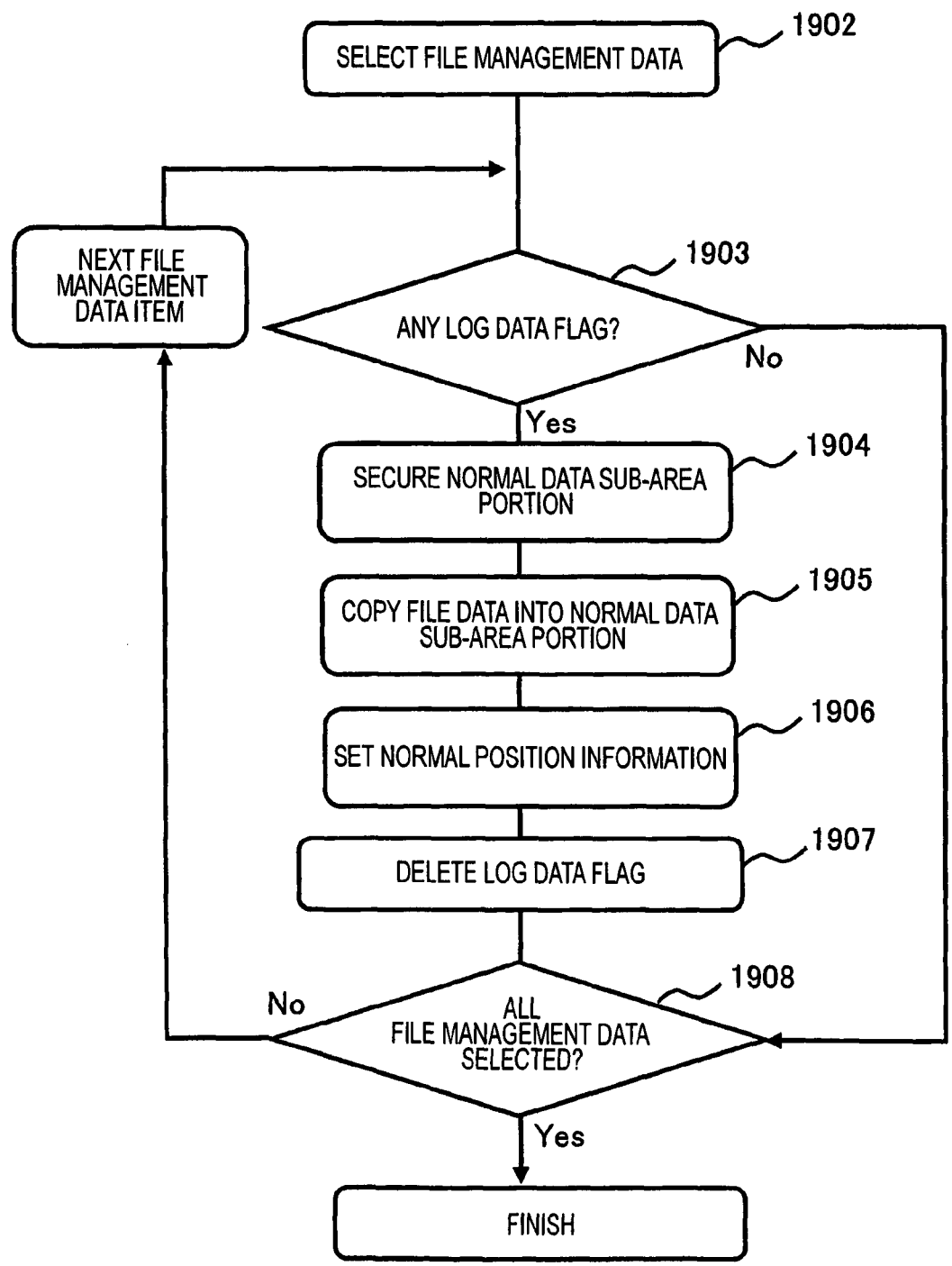
FIG. 19 shows a flow of a synchronization process in the spin-up/resynchronization phase.

FIG. 19 shows a flow of a synchronization process in the spin-up/resynchronization phase.

The input-output controller 204 selects one item of file management data from all the file management data (step 1902). Hereafter, the selected file management data will be referred to as "subject management data" in the description of FIG. 19.

The input-output controller 204, if there is no log data flag in the subject management data (step 1903: No), selects a different item of file management data (step 1908: No).

The input-output controller 204, if there is a log data flag in the subject management data (step 1903: Yes), secures a normal data sub-area portion (step 1905), copies file data stored in a portion in the subject management data expressed by log position information into the portion (step 1906), and deletes the log data flag from the subject management data (step 1907).

Processes from step 1903 onward are carried out for all the file management data.

Figure 20:
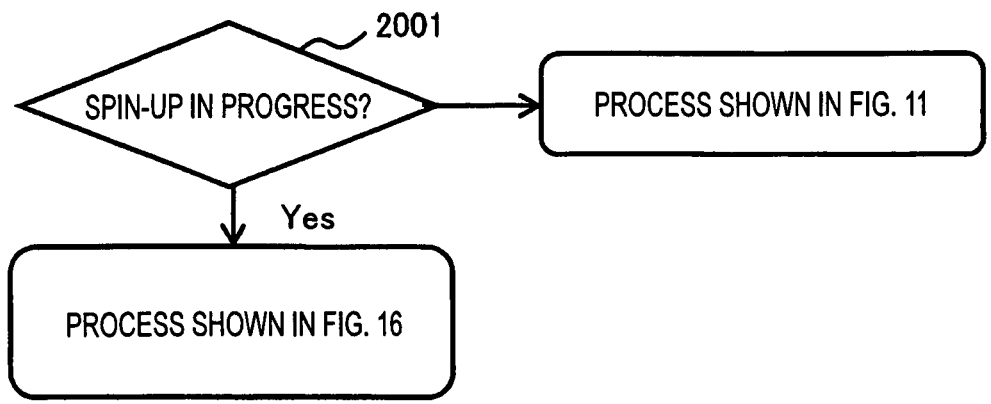
FIG. 20 shows a flow of a new file write process in the spin-up/resynchronization phase.

FIG. 20 shows a flow of a new file write process in the spin-up/resynchronization phase.

If the normal HDD's 120N are in the process of spinning up (step 2001: Yes), the input-output controller 204, as it is not yet possible to write file data in the normal area 301, executes the write process shown in FIG. 16.

Meanwhile, if the spin-up of the normal HDD's 120N is completed (step 2001: No), as it is possible to write the file data in the normal area 301, the input-output controller 204 executes the write process shown in FIG. 11.

Figure 21:
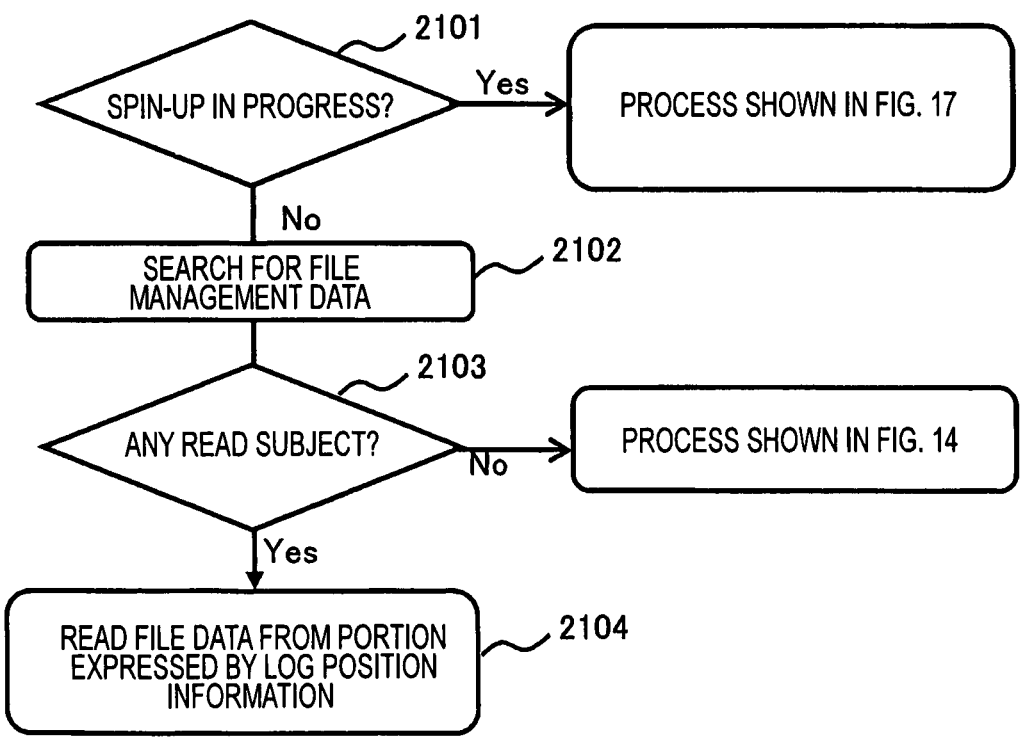
FIG. 21 shows a flow of a read process in the spin-up/resynchronization phase.

FIG. 21 shows a flow of a read process in the spin-up/resynchronization phase.

The input-output controller 204, if the normal HDD's 120N are in the process of spinning up (step 2101: Yes), executes the read process shown in FIG. 17.

Meanwhile, if the spin-up of the normal HDD's 120N is completed (step 2101: No), the input-output controller 204 searches for file management data corresponding to read subject file data (step 2102). The input-output controller 204, based on the file management data, determines whether or not the read subject file data are in the log area 303 (step 2103). If a result of the determination of step 2103 is positive (step 2103: Yes), the input-output controller 204 reads the file data from a portion in the management data expressed by log position information (step 2104). If the result of the determination of step 2103 is negative (step 2103: No), the input-output controller 204 executes the read process shown in FIG. 12.

FIG. 22 shows a flow of an already existing file write process in the spin-up/resynchronization phase.

The input-output controller 204, if the normal HDD's 120N are in the process of spinning up (step 2201: Yes), executes the already existing file process shown in FIG. 18.

Meanwhile, if the spin-up of the normal HDD's 120N is completed (step 2201: No), the input-output controller 204 searches for file management data corresponding to read subject file data (step 2202). The input-output controller 204, based on the file management data, determines whether or not the subject file data are in the log area 303 (step 2203). If a result of the determination of step 2203 is positive (step 2203: Yes), the input-output controller 204 reads the file data from a portion in the management data expressed by log position information (step 2204), and executes the steps 1404 to 1407 shown in FIG. 14. If the result of the determination of step 2203 is negative (step 2203: No), the input-output controller 204 executes the already existing file process shown in FIG. 15.

According to the heretofore described embodiment, the power consumption condition of the log area 303 constantly being the normal condition, the power consumption condition of the normal area 301 is put into the energy saving condition as appropriate. The quantity of the log HDD's 120L forming the basis of the log area 303 is smaller than the quantity of the normal HDD's 120N forming the basis of the normal area 301. For this reason, a high power saving effect can be expected.

Also, according to the heretofore described embodiment, not only write subject file data for the normal area 301, but also read subject file data from the normal area 301, are written in the log area 303. For this reason, in the spin-down phase, when reading file data read in a most recent specified period (for example, one week), it is not necessary to terminate the energy saving condition of the normal area 301. That is, it is possible to reduce a frequency of an occurrence of a necessity of changing the power consumption condition of the normal area 301 from the energy saving condition to the normal condition.

Heretofore, a description has been given of a preferred embodiment of the invention but, the invention not being limited to this embodiment, it goes without saying that various changes are possible without departing from the scope of the invention. For example, it is acceptable that, in place of the HDD, another kind of physical storage device (a flash memory device) is employed. Also, it is acceptable that the normal area and the log area are provided in units of a housing in which the storage device is housed. Also, it is acceptable that, in place of the spin-up and spin-down, a power on and off is employed as a power consumption control for the storage device.

What is claimed is:

1. A storage system connected to an external apparatus which issues an input-output command, which is a write command or a read command, the system comprising:
 a plurality of storage devices, and
 a controller unit which accepts the input-output command from the external apparatus, the controller unit having a memory that includes a cache area that temporarily stores data that is written to or read from the storage devices, wherein
 based on the plurality of storage devices, as well as a normal area, forming an input-output destination in compliance with the input-output command from the external apparatus, which is a storage area in which input-output subject user data are stored, a log area, which is a storage area in which the input-output subject user data are stored, is provided, a quantity of log storage devices, which are storage devices forming a basis of the log area, is smaller than a quantity of normal storage devices, which are storage devices forming a basis of the normal area, when the controller unit is in a power-saving phase during which the controller unit may accept an input-output command from the external apparatus, a power consumption condition of the log storage devices forming the basis of the log area is constantly in a normal condition, which is a power consumption condition in which an input or output of data can be carried out, when the controller unit is in a normal phase, the power consumption condition of the log storage devices is in the normal condition, when the controller unit is in the power-saving phase, a power consumption condition of the normal storage devices forming the basis of the normal area, during a specified period in the power-saving phase, is in an energy saving condition, which is a condition in which a power consumption is lower than in the normal condition, when the controller unit is in the normal phase, the power consumption condition of the normal storage devices is in the normal condition, the controller unit, if the input-output command received from the external apparatus is a write command, in the event that the power consumption condition of the normal storage devices is the normal condition, writes data to both the normal area and the log area in accordance with the write command, the controller unit, if the input-output command received from the external apparatus is a read command, in the event that the power consumption condition of the normal storage devices is the normal condition, reads data from the normal area in accordance with the read command and writes the data read from the normal area to the log area, the controller unit, if the input-output command received from the external apparatus is a write command, in the event that the power consumption condition of the normal storage devices is the energy saving condition, writes data to the log area in accordance with the write command, and the controller unit, if the input-output command received from the external apparatus is a read command, in the event that the power consumption condition of the normal storage devices is the energy saving condition, reads data from the log area in accordance with the read command if the data is stored in the log area and, if the data is not stored in the log area, actuates a shift of the power consumption condition of the normal storage devices to the normal condition, reads the data from the normal area in accordance with the read command, and writes the data read from the normal area to the log area.

2. The storage system according to claim 1, wherein
the external apparatus being a client calculator, and
the user data being file data,
the memory of the controller unit stores each item of file management data corresponding to each item of file data,
the file management data, for corresponding file data which are file data corresponding to the file management data, include:
normal position information expressing a normal position in the normal area in which the corresponding file data are stored,
log position information expressing a log position in the log area in which the corresponding file data are stored,
synchronization information expressing whether the corresponding file data exist in only one of the normal area or log area, or whether the corresponding file data exist in both, and
reflection destination position information expressing a reflection destination position in the normal area of the corresponding file data existing only in the log area, and
the controller unit:
(2-1) in the event that the power consumption condition of the normal storage device is the normal condition,
(2-1-1) on receiving a first write command from the client calculator, writes first file data, which are a write subject according to the first write command, in both the normal area and the log area and, for first file management data corresponding to the first file data, updates the normal position information to information expressing a write destination position of the first file data in the normal area, updates the log position information to information expressing a write destination position of the first file data in the log area, and updates the synchronization information to information expressing the fact that the first file data exist in both the normal area and the log area,
(2-1-2) on receiving a second read command from the client calculator, reads second file data, which are a read subject according to the second read command, from a read original position in the normal area, in compliance with the second read command, presents the second file data read to the client calculator, writes the second file data in the log area in the event that the synchronization information in second file management data corresponding to the second file data expresses the fact that the second file data exist in only the normal area and, for the second file management data, updates the log position information to information expressing a write destination position of the second file data in the log area, and updates the synchronization information to information expressing the fact that the second file data exist in both the normal area and the log area,
(2-1-3) changes the power consumption condition of the normal storage device from the normal condition to the energy saving condition in the event that an input-output frequency for the normal area is low,
(2-2) in the event that the power consumption condition of the normal storage device is the energy saving condition,
(2-2-1) on receiving a third write command from the client calculator, writes third file data, which are a write subject according to the third write command, in the log area and, for third file management data corresponding to the third file data, updates the log position information to information expressing a write destination position of the third file data in the log area, updates the synchronization information to information expressing the fact that the third file data exist in only the log area, and updates the reflection destination position information to information expressing a write destination position in the normal area complying with the third write command,
(2-2-2) on receiving a fourth read command from the client calculator, referring to fourth file management data corresponding to fourth file data, which are a read subject according to the fourth read command, carries out a determination of whether or not the fourth file data exist in the log area, (2-2-2-1) in the event that a result of the determination of (2-2-2) is positive, reads the fourth file data from the log position in the fourth file management data expressed by the log position information, and presents the fourth file data read to the client calculator, (2-2-2-2) in the event that the result of the determination of (2-2-2) is negative, changes the power consumption condition of the normal storage device from the energy saving condition to the normal condition, reads the fourth file data from the normal position in the fourth file management data expressed by the normal position information, presents the fourth file data read to the client calculator, writes the fourth file data in the log area and, for the fourth file management data, updates the log position information to information expressing a write destination position of the fourth file data in the log area, updates the synchronization information to information expressing the fact that the fourth file data exist in both the normal area and the log area, and returns the power consumption condition of the normal storage device from the normal condition to the energy saving condition, (2-2-3) changes the power consumption condition of the normal storage device from the energy saving condition to the normal condition in the event that the input-output frequency for the normal area is high, writes the corresponding file data corresponding to file management data, including synchronization information expressing the fact that the corresponding file data exist in only the log area, in the reflection destination position in the normal area expressed by the reflection destination position information in the file management data, and updates the synchronization information in the file management data to information expressing the fact that the corresponding file data exist in both the normal area and the log area.

3. The storage system according to claim 2, wherein each item of file management data being stored in the log area, and the file management data stored in the memory in the controller unit being file management data read from the log area, the controller unit, in the event of updating the file management data stored in the memory, updates details of file management data, corresponding to the file management data, stored in the log area to details of the file management data stored in the memory.

4. The storage system according to claim 2, further comprising:

an NAS (Network Attached Storage) head, and an NAS backend storage including the plurality of storage devices and a controller which carries out an input and output with respect to the plurality of storage devices, wherein the controller unit being configured of the NAS head and the controller connected to the NAS head, the NAS head, managing the normal area and the log area, issues a power consumption control command specifying the normal area to the controller, and the controller, managing which among the plurality of storage devices are normal storage devices and which are log storage devices, in response to the power consumption control command, identifies the normal storage devices forming the basis of the normal area, arid controls a power consumption condition of the identified normal storage devices.

5. The storage system according to claim 2, wherein the controller unit, when writing file data in the log area, in the event that there is no free space in the log area, writes the file data in an area in the log area in which file data written the longest ago are stored.

6. The storage system according to claim 2, wherein the controller unit, in the event of writing write subject file data in both the normal area and log area in response to a write command from the client calculator, writes the write subject file data in the normal area first and, when the writing in the normal area is completed, reports a write completion to the client calculator before writing the write subject file data in the log area.

7. The storage system according to claim 1, wherein the controller unit (7-1) in the event that the power consumption condition of the normal storage device is the normal condition, on receiving a first read command from the external apparatus, reads first user data, which are a read subject complying with the first read command, from the normal area, and writes the first user data read in the log area, and (7-2) in the event that the power consumption condition of the normal storage device is the energy saving condition, on receiving a second read command from the external apparatus, reads second user data, which are a read subject complying with the second read command, from the log area.

8. The storage system according to claim 7, wherein the controller, in the event that the second user data are not in the log area in (7-2) above, changes the power consumption condition of the normal storage device from the energy saving condition to the normal condition, and subsequently reads the second user data from normal area.

9. The storage system according to claim 1, wherein the user data being file data, the memory of the controller unit stores each item of file management data corresponding to each item of file data, the file management data, for corresponding file data which are file data corresponding to the file management data, include:

normal position information expressing a normal position in the normal area in which the corresponding file data are stored, log position information expressing a log position in the log area in which the corresponding file data are stored, synchronization information expressing whether the corresponding file data exist in only one of the normal area or log area, or whether the corresponding file data exist in both, and reflection destination position information expressing a reflection destination position in the normal area of the corresponding file data existing only in the log area, and the controller unit, when receiving a write command, (9-1) in the event that the power consumption condition of the normal storage device is the normal condition, writes write subject file data complying with the write command in both the normal area and the log area, and updates file management data corresponding to the write subject file data, (9-2) in the event that the power consumption condition of the normal storage device is the energy saving condition, writes the write subject file data in only the log area, and updates the reflection destination position information in file management data corresponding to the write subject file data to information expressing a write destination position in the normal area complying with the write command, and (9-3) in the event of changing the power consumption condition of the normal storage device from the energy saving condition to the normal condition, writes the write subject file data corresponding to file management data, including synchronization information expressing the fact that the write subject file data exist in only the log area, in the reflection destination position in the normal area expressed by the reflection destination position information in the file management data, and updates the synchronization information in the file management data to information expressing the fact that the write subject file data exist in both the normal area and the log area.

10. The storage system according to claim 9, wherein
each item of file management data being stored in the log area, and
the file management data stored in the memory in the controller unit being file management data read from the log area,
the controller unit, in the event of updating the file management data stored in the memory, updates details of file management data, corresponding to the file management data, stored in the log area to details of the file management data stored in the memory.

11. The storage system according to claim 1, further comprising:
an NAS (Network Attached Storage) head, and
an NAS backend storage including the plurality of storage devices and a controller which carries out an input and output with respect to the plurality of storage devices, wherein
the controller unit being configured of the NAS head and the controller connected to the NAS head,
the NAS head, managing the normal area and the log area, issues a power consumption control command specifying the normal area to the controller, and
the controller, managing which among the plurality of storage devices are normal storage devices and which are log storage devices, in response to the power consumption control command, identifies the normal storage devices forming the basis of the normal area, and controls a power consumption condition of the identified normal storage devices.

12. The storage system according to claim 1, wherein the controller unit, when writing user data in the log area, in the event that there is no free space in the log area, writes the user data in an area in the log area in which user data written the longest ago are stored.

13. The storage system according to claim 1, wherein a RAID group in which the normal storage devices forming the basis of the normal area are included is different from a RAID group in which the log storage devices forming the basis of the log area are included.

14. The storage system according to claim 1, wherein the controller unit
(14-1) in the event that the power consumption condition of the normal storage device is the normal condition, changes the power consumption condition of the normal storage device from the normal condition to the energy saving condition in the event that an input-output frequency for the normal area is low, and
(14-2) in the event that the power consumption condition of the normal storage device is the energy saving condition, changes the power consumption condition of the normal storage device from the energy saving condition to the normal condition in the event that the input-output frequency for the normal area is high.

15. A power consumption control method for a storage system connected to an external apparatus which issues an input-output command, which is a write command or a read command, the storage system including a plurality of storage devices and a controller unit that accepts the input-output command from the external apparatus, the controller unit having a memory that includes a cache area that temporarily stores data that is written to or read from the storage devices, the method comprising:
based on the plurality of storage devices included in the storage system, providing a normal area, forming an input-output destination in compliance with the input-output command from the external apparatus, which is a storage area in which input-output subject user data are stored, and a log area, which is a storage area in which the input-output subject user data are stored, at which time, making a quantity of log storage devices, which are storage devices forming a basis of the log area, smaller than a quantity of normal storage devices, which are storage devices forming a basis of the normal area;
when in a power-saving phase during which an input-output command may be accepted from the external apparatus, setting a power consumption condition of the log storage devices forming the basis of the log area constantly in a normal condition during which an input or output of data can be carried out;
when in a normal phase, setting the power consumption condition of the log storage devices in the normal condition;
when in the power-saving phase, setting a power consumption condition of the normal storage devices forming the basis of the normal area, during a specified period in the power-saving phase, in an energy saving condition, which is a condition in which a power consumption is lower than in the normal condition;
when in the normal phase, setting the power consumption condition of the normal storage devices in the normal condition;
if the input-output command received from the external apparatus is a write command, in the event that the power consumption condition of the normal storage device is the normal condition, writing data both the normal area and the log area in accordance with the write command;
if the input-output command received from the external apparatus is a read command, in the event that the power consumption condition of the normal storage devices is the normal condition, reading data from the normal area in accordance with the read command and writing the data read from the normal area to the log area;
if the input-output command received from the external apparatus is a write command, in the event that the power consumption condition of the normal storage devices is the energy saving condition, writing data to the log area in accordance with the write command; and
if the input-output command received from the external apparatus is a read command, in the event that the power consumption condition of the normal storage devices is the energy saving condition, reading data from the log area in accordance with the read command if the data is stored in the log area and, if the data is not stored in the log area, actuating a shift of the power consumption condition of the normal storage devices to the normal condition, reading the data from the normal area in accordance with the read command, and writing the data read from the normal area to the log area.

* * * * *